(12) United States Patent
Hull et al.

(10) Patent No.: US 6,976,032 B1
(45) Date of Patent: Dec. 13, 2005

(54) NETWORKED PERIPHERAL FOR VISITOR GREETING, IDENTIFICATION, BIOGRAPHICAL LOOKUP AND TRACKING

(75) Inventors: Jonathan J. Hull, San Carlos, CA (US); Derek Poppink, Mountain View, CA (US); Marko Balabanovic, London (GB); Michael Baxter, Sunnyvale, CA (US); Jamey Graham, San Jose, CA (US); Peter E. Hart, Menlo Park, CA (US); Dar-Shyang Lee, Union City, CA (US); Gregory Wolff, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 362 days.

(21) Appl. No.: 09/714,785

(22) Filed: Nov. 15, 2000

Related U.S. Application Data

(60) Provisional application No. 60/166,081, filed on Nov. 17, 1999.

(51) Int. Cl.[7] ............................................. G06F 17/00
(52) U.S. Cl. ..................................... 707/104.1; 707/10
(58) Field of Search .................. 707/1–10, 100–104.1; 709/200–203, 217–219

(56) References Cited

U.S. PATENT DOCUMENTS

| | | | |
|---|---|---|---|
| 4,578,718 A | 3/1986 | Parker et al. | |
| 4,686,698 A | 8/1987 | Tompkins et al. | |
| 4,787,063 A | 11/1988 | Muguet | |
| 4,905,094 A | 2/1990 | Pocock et al. | |
| 4,963,995 A | 10/1990 | Lang | |
| 5,091,931 A | 2/1992 | Milewski | |
| 5,164,839 A | 11/1992 | Lang | |
| 5,206,929 A | 4/1993 | Langford et al. | |
| 5,265,205 A | 11/1993 | Schroder | |
| 5,321,396 A | 6/1994 | Lamming et al. | |
| 5,475,741 A | 12/1995 | Davis et al. | |

(Continued)

FOREIGN PATENT DOCUMENTS

JP            03129990 A    *   6/1991    ............ H04N 7/18

(Continued)

OTHER PUBLICATIONS

Addlesee, M.D.; Jones, A.H.; Livesey, F.; and Samaria, F.S., "The ORL Active Floor," IEEE Personal Communications, vol. 4, No. 5, Oct. 1997, pp. 35-41. ftp://ftp.uk.research.att.com:/pub/docs/att/tr.97.11.pdf.

(Continued)

*Primary Examiner*—Greta Robinson
*Assistant Examiner*—Harold E. Dodds, Jr.
(74) *Attorney, Agent, or Firm*—Townsend and Townsend and Crew LLP

(57) ABSTRACT

According to the invention, a visitor kiosk for the capture and storage of personal information about visitors. The visitor kiosk is placed at the entry point to a facility being monitored. Each visitor signs in at the kiosk. Their business card and an image of their face are scanned. If they do not have a business card, their name and company are entered manually. They also enter the name of the person they are visiting and the purpose for their visit. The person they are visiting is notified of the arrival of the visitor by email or by voice telephone. The data about the visitor is stored locally or remotely. Automatic lookups of various information about the visitor are performed and communicated to the person being visited. A network interface allows users to enter information about visitors they are expecting to arrive. A telephone interface is provided for input of voice greetings as well as checking on the arrival status of visitors.

32 Claims, 22 Drawing Sheets

U.S. PATENT DOCUMENTS

| | | | |
|---|---|---|---|
| 5,491,511 A | 2/1996 | Odle | |
| 5,502,774 A * | 3/1996 | Bellegarda et al. | 382/159 |
| 5,530,235 A | 6/1996 | Stefik et al. | |
| 5,535,063 A | 7/1996 | Lamming | |
| 5,537,141 A | 7/1996 | Harper et al. | |
| 5,539,665 A | 7/1996 | Lamming et al. | |
| 5,596,581 A | 1/1997 | Saeijs et al. | |
| 5,610,841 A | 3/1997 | Tanaka et al. | |
| 5,673,016 A | 9/1997 | Lutes | |
| 5,686,957 A | 11/1997 | Baker | |
| 5,706,290 A | 1/1998 | Shaw et al. | |
| 5,717,869 A | 2/1998 | Moran et al. | |
| 5,717,879 A | 2/1998 | Moran et al. | |
| 5,721,878 A | 2/1998 | Ottesen et al. | |
| 5,729,931 A | 3/1998 | Wade | |
| 5,734,719 A | 3/1998 | Tsevdos et al. | |
| 5,751,281 A | 5/1998 | Hoddie et al. | |
| 5,760,767 A | 6/1998 | Shore et al. | |
| 5,764,789 A * | 6/1998 | Pare et al. | 382/115 |
| 5,767,897 A | 6/1998 | Howell | |
| 5,793,365 A | 8/1998 | Tang et al. | |
| 5,799,150 A | 8/1998 | Hamilton et al. | |
| 5,802,294 A | 9/1998 | Ludwig et al. | |
| 5,845,261 A * | 12/1998 | McAbian | 705/26 |
| 5,854,831 A | 12/1998 | Parsadayan et al. | |
| 5,862,292 A | 1/1999 | Kubota et al. | |
| 5,946,654 A | 8/1999 | Newman et al. | |
| 5,978,477 A | 11/1999 | Hull et al. | |
| 5,986,655 A | 11/1999 | Chiu et al. | |
| 5,987,454 A * | 11/1999 | Hobbs | 707/4 |
| 5,990,934 A | 11/1999 | Nalwa | |
| 5,991,429 A * | 11/1999 | Coffin et al. | 382/118 |
| 5,999,173 A | 12/1999 | Ubillos | |
| 6,008,807 A | 12/1999 | Bretschneider et al. | |
| 6,020,883 A * | 2/2000 | Herz et al. | 345/721 |
| 6,084,582 A | 7/2000 | Qureshi et al. | |
| 6,154,601 A | 11/2000 | Yaegashi et al. | |
| 6,154,771 A | 11/2000 | Rangan et al. | |
| 6,189,783 B1 * | 2/2001 | Motomiya et al. | 235/375 |
| 6,209,000 B1 * | 3/2001 | Klein et al. | 707/203 |
| 6,249,281 B1 | 6/2001 | Chen et al. | |
| 6,332,147 B1 | 12/2001 | Moran et al. | |
| 6,334,109 B1 * | 12/2001 | Kanevsky et al. | 705/14 |
| 6,349,297 B1 * | 2/2002 | Shaw et al. | 707/4 |
| 6,369,835 B1 | 4/2002 | Lin | |
| 6,396,500 B1 | 5/2002 | Qureshi et al. | |
| 6,405,203 B1 * | 6/2002 | Collart | 707/10 |
| 6,469,711 B2 | 10/2002 | Foreman et al. | |
| 6,490,601 B1 * | 12/2002 | Markus et al. | 715/507 |
| 6,646,655 B1 | 11/2003 | Brandt et al. | |
| 6,728,753 B1 | 4/2004 | Parasnis et al. | |
| 6,779,024 B2 * | 8/2004 | DeLaHuerga | 709/217 |
| 6,789,228 B1 | 9/2004 | Merril et al. | |
| 6,816,858 B1 | 11/2004 | Coden et al. | |
| 2002/0097885 A1 | 7/2002 | Birchfield et al. | |

FOREIGN PATENT DOCUMENTS

| | | | | |
|---|---|---|---|---|
| JP | 10246041 A * | 9/1998 | | E05B 49/00 |
| WO | WO 02/013522 A2 | 2/2002 | | |
| WO | WO 02/058432 A2 | 7/2002 | | |

OTHER PUBLICATIONS

Cunado, D.; Nash, J.M.; Nixon, M.S.; and Carter, J.N., "Gait Extraction and Description by Evidencing Gathering," Proceedings of the Second International Conference on Audio and Video-based Person Identification, Washington, D.C., Mar. 22-23, 1999, pp. 43-48.

Eldridge, M.; Lamming, M.; and Flynn, M., "Does A Video Diary Help Recall?", Technical Report EPC-1991-124, People and Computers VII, eds. Monk et al., 1992, pp. 257-269.

Konneker, L., "Automating Receptionists," Proceedings of the 1986 IEEE International Conference on Systems, Man, and Cybernetics, Atlanta, GA, Oct. 14-17, 1986, pp. 1592-1596.

Lamming, M.G.; and Newman, W.N., "Activity-based Information Retrieval: Technology in Support of Personal Memory," in F.H. Vogt (ed.), Personal Computers and Intelligent Systems. Proceedings of Information Processing 92, vol. III, Elsevier Science Publishers, 1992, pp. 68-81.

Lovstrand, L., "Being Selectively Aware with the Khronika System," Proceedings of the Second European Conference on Computer-Supported Cooperative Work, Kluwer Academic Publishers, 1991, pp. 265-277.

Newman, W.M., Eldridge; and Lamming, M.G., "PEPOYS; Generating Autobiographies by Automatic Tracking," Proceedings of the Second European Conference on Computer-Supported Cooperative Work, Sep. 25-27, 1991, Amsterdam, The Netherlands, pp. 175-188.

Plamondon, R.; and Lorette, G., "Automatic Signature, Verification and Writer Identification—The State of the Art," Pattern Recognition, vol. 22, No. 2, 1989, pp. 107-131.

Seiko Instruments, Inc., "Smart Lobby: The Electronic Sign-In Book That Tracks Visitors and Prints Badges, User Guide for Windows," Manual Part No.: 22-93000-00, copyright 1997.

Sony Music Corporation, "E-Guide Unmanned Reception System," Japan Industrial Journal, May 20, 1996, p. 6, (http://salmon.crc.ricoh.com:8001/hull/1999/8/11207/11207.html).

Vierdaz, M.A., "The Itsy Pocket Computer Version 1.5: User's Manual," Technical Note TN-54, Compaq Western Research Laboratory, Jul. 1998., pp. 1-37.

Want, R.; Hopper, A.; Falcao, V.; and Gibbons, J.J., "The Active Badge Location System," ACM TOIS, Transactions on Information Systems, vol. 10, No. 1, Jan., 1992, pp. 91-102.

Rosenschein, S., "New Techniques for Knowledge Capture," from TTI/Vanguard Conference: Knowledge Management Comes of Age, pp. 1-3, Sep. 23-24, 2003.

Foote, J. et al. "An Intelligent Media Browser Using Automatic Multimodal Analysis," ACM Multimedia, 1998, pp. 375-380.

Girgensohn, A, and Boreczky, J.S. "Time-Constrained Keyframe Selection Technique," Multimedia Tools, 11(3): 347-358.

Rangan, P.V. "Software Implementation of VCRs on Personal Computing Systems," IEEE, 1992, pp. 635-640.

Rangan, P.V. et al., "A Window-Based Editor for Digital Video and Audio," IEEE 1992 pp. 640-648.

Product Description for Meeting Companion by Quindi Corporation, downloaded from http://quindi.com/product.htm on Jan. 24, 2005.

* cited by examiner

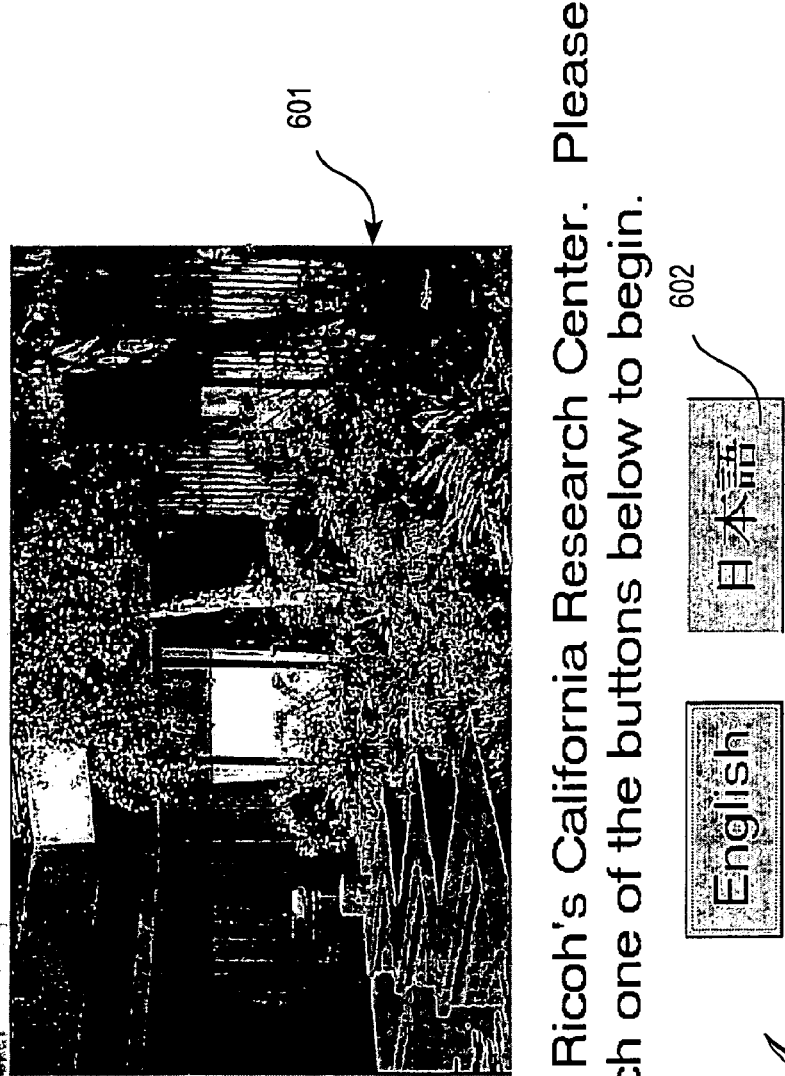
Ricoh Touchscreen Guestbook
Welcome to Ricoh's California Research Center. Please touch one of the buttons below to begin.
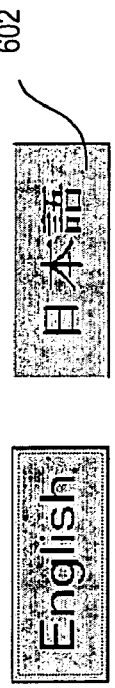
Fig. 6A

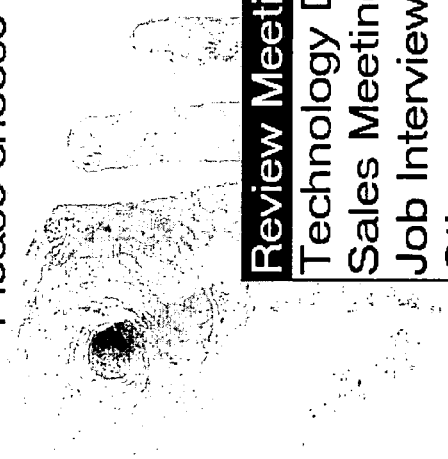
Fig. 6C

Please insert your business card face down in the CardScan.
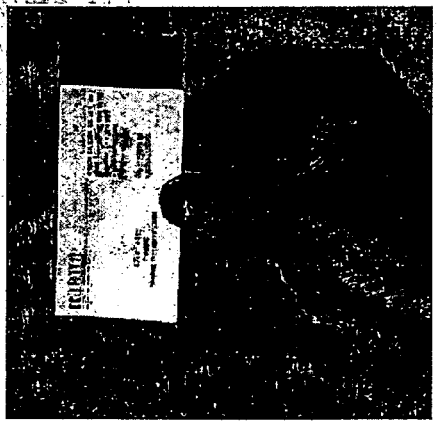
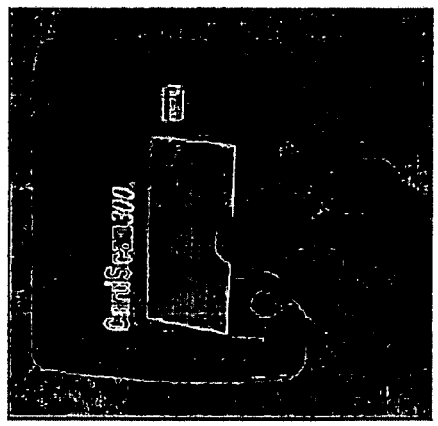
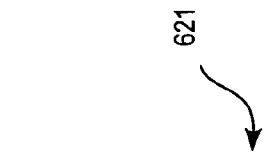
Fig. 6E

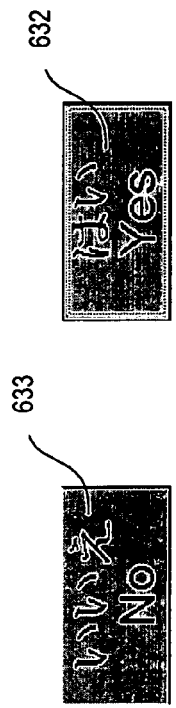
Fig. 6G

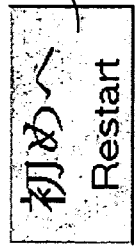
Please look at the camera and press "Take" when you are ready.
Fig. 6H

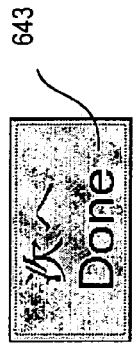  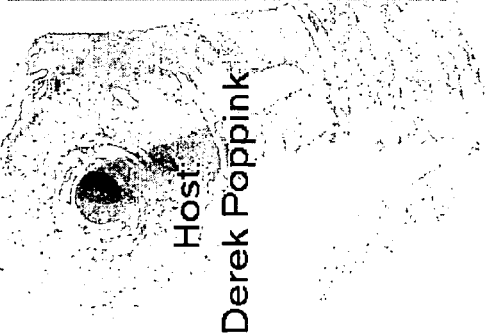  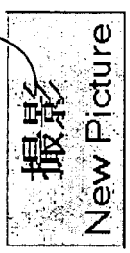 
Fig. 6J

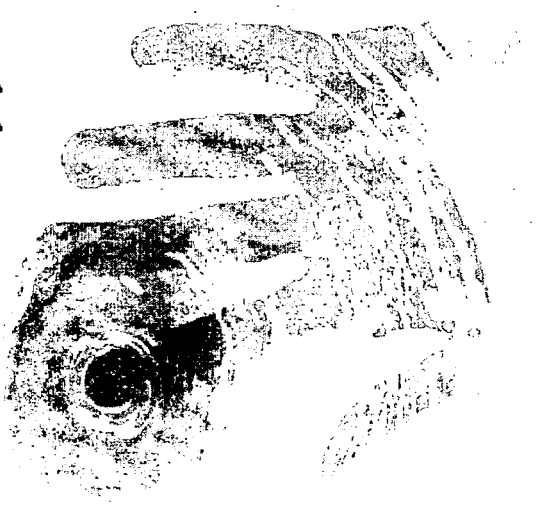
Fig. 67

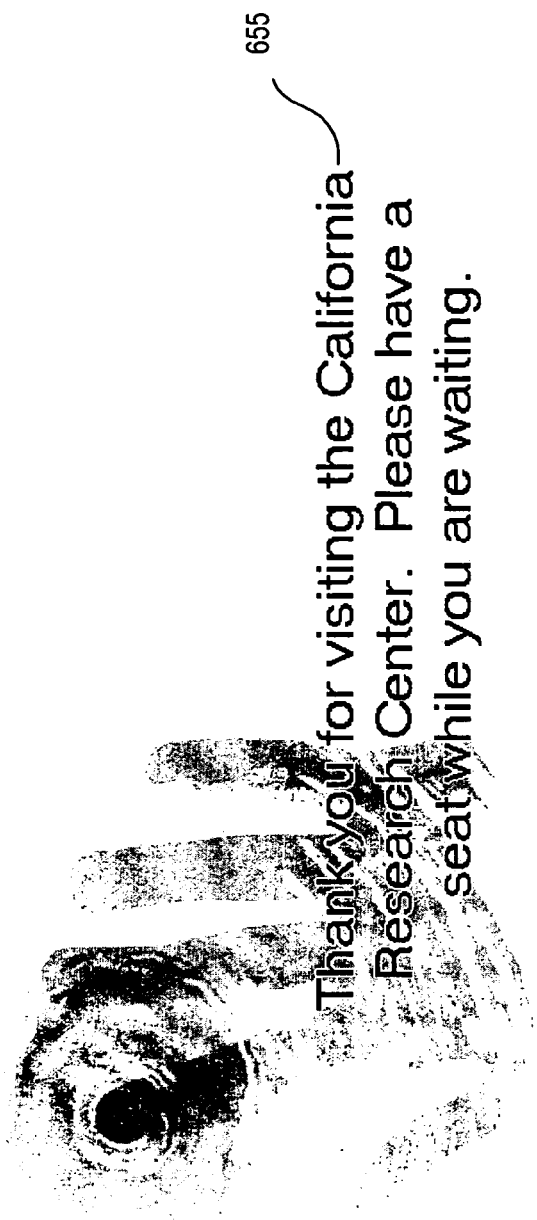
Fig. 6Y

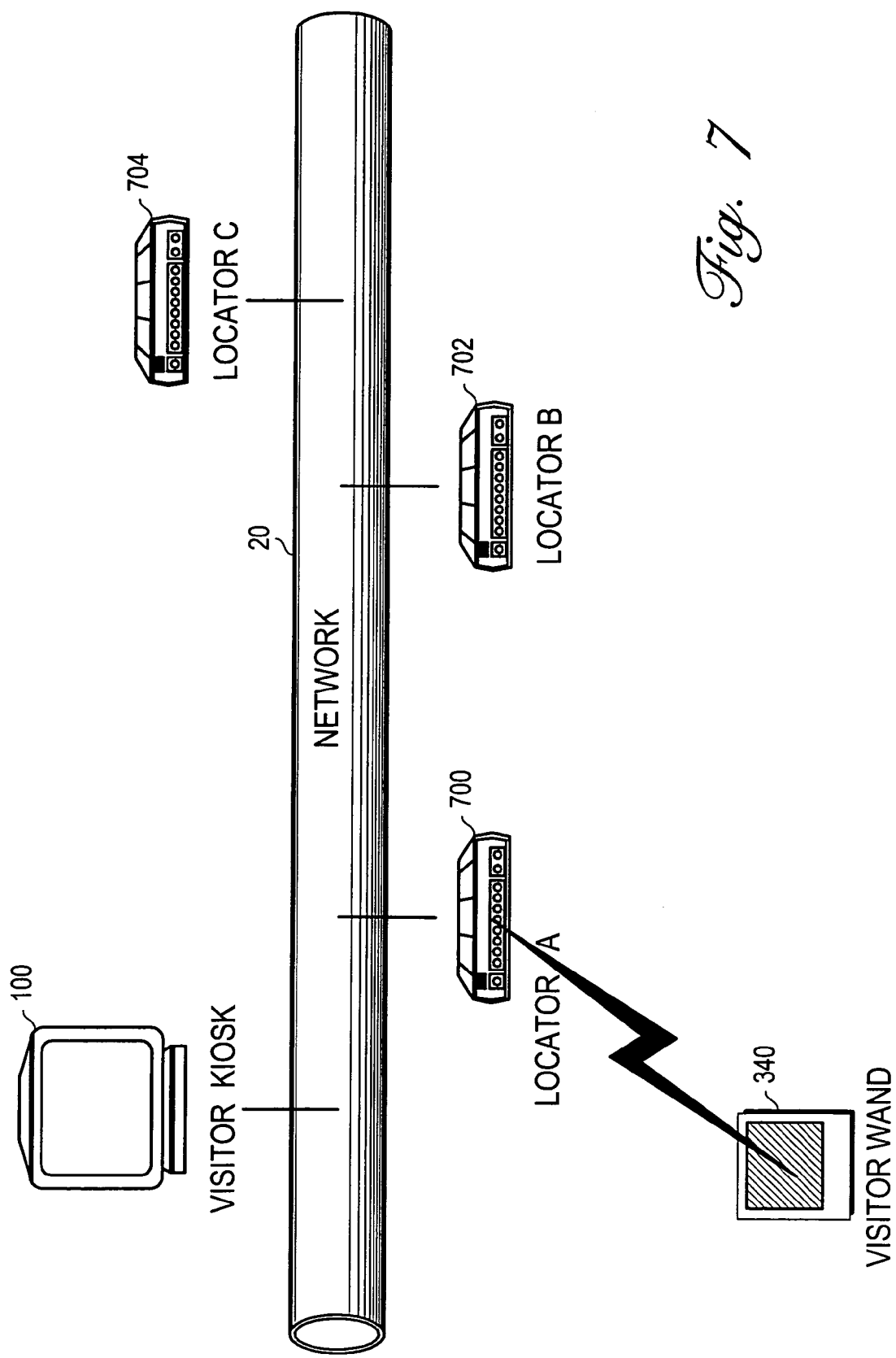

NETWORKED PERIPHERAL FOR VISITOR GREETING, IDENTIFICATION, BIOGRAPHICAL LOOKUP AND TRACKING

CROSS-REFERENCES TO RELATED APPLICATIONS

This application claims priority from U.S. Patent Application Ser. No. 60/166,081, filed Nov. 17, 1999, the entire disclosure of which is incorporated by reference.

BACKGROUND OF THE INVENTION

The present invention relates generally to techniques for automated information collection, and specifically to systems and apparatus for gathering information about visitors.

Everyday, in work places throughout the world, visitors are received at places of business, government agencies, real estate offices and so forth. The visitor is often greeted by a receptionist, who offers the visitor a sign-in sheet to record information about the visit. The visitor writes her name, place of business, person to be visited and the like in the sign-in sheet. In some cases, this information might be entered into a computer database manually by a receptionist or a security officer. Such information is typically used for security purposes. Sometimes, the visitor will be issued a guest pass, or identity badge to announce her presence. The receptionist often notifies the person to be visited that the visitor has arrived. These activities occur so often that they have become part of the culture in the U.S. and many other countries as well.

Opportunities for improving techniques for gathering information about visitors exist. Since the entry point to an office is one place where people are required to identify themselves, valuable data about the visitor can be readily gathered at this point.

What is needed are improved techniques for automating the collecting of information about visitors.

SUMMARY OF THE INVENTION

The present invention provides techniques for collecting information about visitors. In one embodiment, the present invention provides a visitor kiosk system for the greeting, identification, biographical lookup, and tracking of visitors to a facility. The visitor kiosk is placed at the entry point of the facility being monitored. Each visitor to the facility "signs-in" at the kiosk. The visitor's business card is scanned, and an image of the visitor is obtained. If the visitor does not have a business card, the visitor's name and company name can be entered manually. In specific embodiments, the visitor's speech is also recorded. The visitor also enters a name of a person to be visited and a purpose for the visit. The person to be visited is notified of the arrival of the visitor by email or by voice telephone. The data about the visitor can be stored locally or remotely. Automatic lookups of various kinds of information about the visitor are performed and communicated to the person being visited. A network interface allows users to enter information about visitors they are expecting to arrive, as well as to make notes about the visit after the visitor leaves. A telephone interface provides the capability to input voice messages, as well as check the status of visitors.

In a representative embodiment according to the present invention, a visitor information gathering apparatus is provided. The apparatus can be embodied as a kiosk that comprises a display; one or more input devices; a storage; a processor; and one or more sensors. The processor captures information about visitors from inputs to the input devices made responsive to prompts provided by the processor through the display, as well as information obtained from the sensors. Then, the processor stores the information about the visitors. In specific embodiments, the input devices can be any of a touch screen, a keyboard, a mouse, trackball, touch pad, a combination thereof, or other types of input devices. The apparatus may display a greeting on the display. The greeting can be customized to the interests of visitors, and can include a slide show of product images, advertising, stock values, daily cartoons, and news, for example. The sensors can include any of a business card scanner, a microphone, a video camera, a speaker, a docking station for obtaining information from one or more visitor wands, a handwriting tablet, one or more biological or biometric sensors, and/or one or more security sensors. The information about the visitors includes one or more of a name, an organization represented by the visitor, a purpose of a visit, a date and/or time of the visit, a person to be visited, and an identity of a group visiting together. Furthermore, other kinds of information can be provided by the sensors attached to the apparatus. For example, the microphone can record a sample of the visitor's speech, the video camera can record images of the visitor, the handwriting tablet can record the visitor's signature. Some information about the visitor is gathered from the sensors without the visitor being aware of the gathering. This is referred to as "unconscious capture" herein. Other information is gathered from the visitor with the visitor's knowledge and awareness. This type of information gathering is referred to as "conscious capture." These terms are not intended to be limiting.

In certain specific embodiments, various types of interfaces can connect the kiosk to users of information. For example, a telephony interface can provide telephone connections via the public switched telephone network. One or more network interfaces can connect the kiosk to one or more networks for communications. A public server can be communicated with using the connection to the network and network interface, for example. Further, a local server can connect one or more kiosks to one or more users of information using a local area network (LAN), for example. The local server provides a storage place for holding information about visitors.

In a specific embodiment, the business card scanner scans one or both sides of a business card having printing on one or both sides. Then, if the computer detects the presence of text on one or both sides, it processes the text in accordance with the language of the text. The text is processed using an OCR software in a particular embodiment.

In another representative embodiment according to the present invention, a method for collecting information about visitors is provided. The method can comprise a variety of elements, such as for example, gathering information about the visitors in an interactive session with an automated kiosk. Placing the information into a format in which the information may be stored is also part of the method. The method includes storing the information for retrieval. Storage is done either locally, or remotely is specific embodiments. Automatically obtaining information about the visitor from one or more sources and providing the information about the visitor is also part of the method. The information gathered at the kiosk can be provided to persons interested in the information. In specific embodiments, the obtaining information about the visitor from one or more sources can be one or more of performing a search on the Internet, searching a publicly available database, searching a database of visitor information obtained from the kiosk, searching a local database, as well as others. Further, in some specific embodiments, the obtaining information can include sensing information about the visitor without said visitor's awareness (unconscious capture), as well as obtaining information about the visitor with prompts and the like, of which the visitor is aware (conscious capture).

In a further representative embodiment according to the present invention, a system for tracking activity within a facility is provided. The system can comprise a plurality of locator apparatuses; a network, interconnecting the plurality of locator apparatuses; and one or more portable visitor wands. The portable visitor wands communicate an identity of an associated visitor to one or more locator apparatuses, and the locator apparatuses track position of a visitor based upon the communicated identities. In specific embodiments, the visitor wands can be handheld wand like apparatuses, personal data assistants (PDAs), active badges, portable telephone like apparatuses, and the like. The communication link between the locator apparatuses and the visitor wands can be any of an infrared communication link, a radio communication link, an optical communication link, sensing a magnetic card, a telephone communication link, a pager communication link, or a Bluetooth™ communication link. Bluetooth™ is a wireless protocol standard developed by the Bluetooth™ Special Interest Group. (see, e.g., www.bluetooth.com).

In specific embodiments, one or more logs are created that record the exchange of identifies communicated from the visitor wands to the locator apparatuses. One type of log, called a "personal history" provides a record of the locator apparatuses visited by a particular visitor. Another type of log, called a "location hsitory" provides a record of the visitors who visited a particular locator apparatus.

In a yet further representative embodiment, the present invention provides an apparatus for automatically populating a database. The apparatus comprises a display; one or more input devices; a storage; and a processor. The processor captures information from the input devices. This information is entered by the visitor responsive to prompts provided by the processor through the display. The processor stores the information about visitors into the storage. The information includes personnel information that may be used to annotate documents is a specific embodiment. Further, in certain specific embodiments, the personnel information is used to replace one or more names by hypertext links to the personnel information.

In a still yet further representative embodiment, a method for providing an image is provided. The method comprises automatically capturing one or more images of a person. The method also includes providing to the person the images so captured. Receiving from the person an indication of a preferred image that is selected from among the images is also part of the method.

Numerous benefits are achieved by way of the present invention over conventional techniques. The present invention can provide automated techniques for gathering, organizing, retrieving and archiving information about visitors. Specific embodiments can capture information about a visitor and the visit either with (conscious capture) or without (unconscious capture) the visitor's knowledge.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIGS. 6A–6M illustrate representative screens displayed during a representative greeting session with a specific embodiment according to the present invention;

FIG. 7 illustrates a representative example of visitor wand tracking in a specific embodiment according to the present invention.

DESCRIPTION OF THE SPECIFIC EMBODIMENTS

The present invention provides techniques for the capture and storage of personal information about visitors. In a presently preferred embodiment, the invention provides an interactive visitor kiosk that is placed at the entry point of a facility. Each visitor to the facility is invited to "sign-in" at the kiosk. During the sign-in process, the kiosk collects certain information about the visitor and her visit. The visitor's business card is scanned, and an image of the visitor is obtained. If the visitor does not have a business card, the visitor's name and company name can be entered manually. In specific embodiments, the visitor's speech is also recorded. The visitor also enters a name of a person to be visited and a purpose for the visit. The person to be visited is notified of the arrival of the visitor by email or by voice telephone. The data about the visitor can be stored locally and/or remotely.

A variety of information about the visitor is searched for automatically, and the results communicated to the person being visited. A network interface allows users at the facility to enter information about visitors they are expecting. A telephone interface provides a mechanism to input voice greetings as well as checking on the arrival status of visitors.

Figure 1:
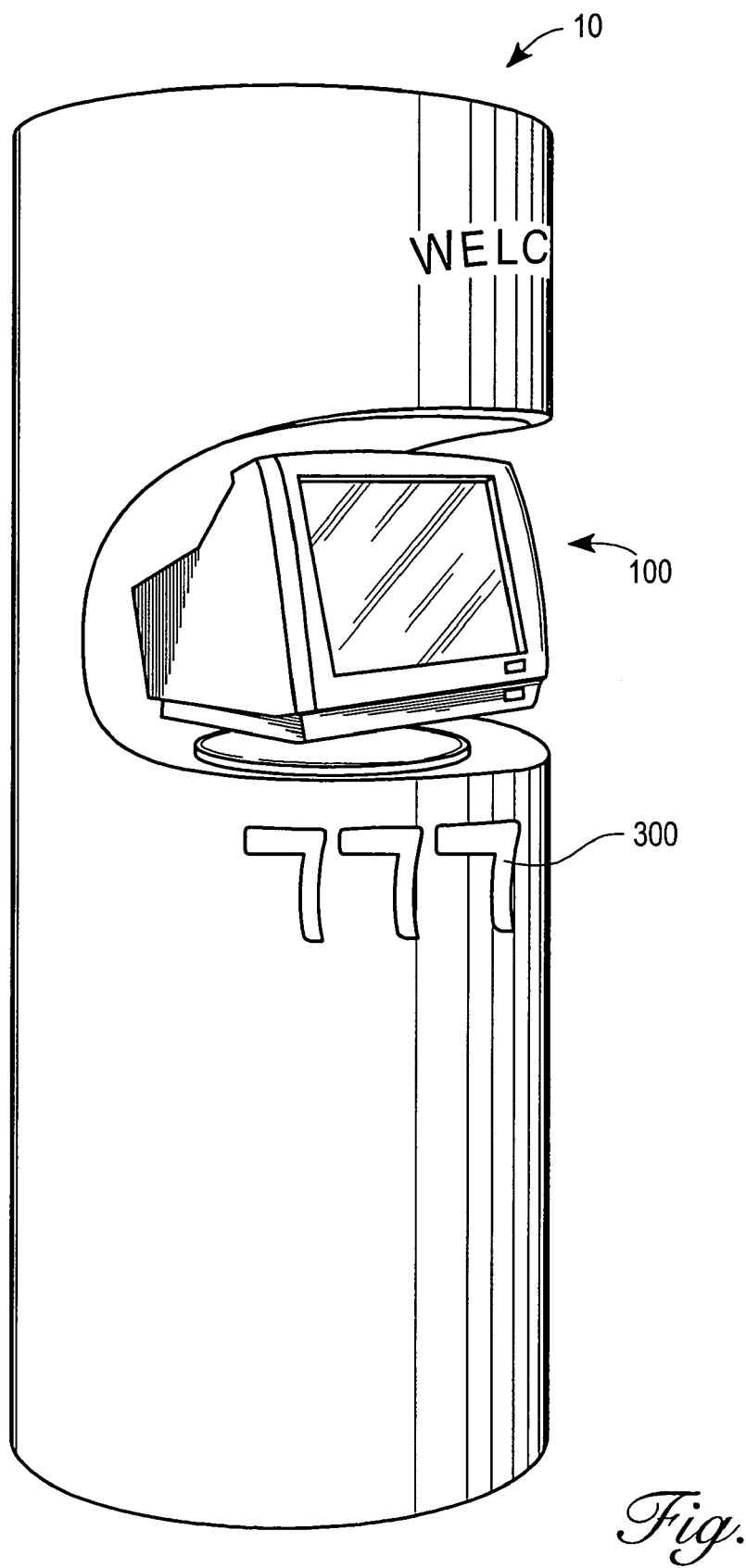
FIG. 1 illustrates a schematic diagram of a representative visitor greeting and information collecting kiosk in a specific embodiment according to the present invention.

FIG. 1 illustrates a representative visitor kiosk in a specific embodiment according to the present invention. FIG. 1 shows a visitor welcome area 10 that includes a stationary visitor kiosk 100, and a plurality of portable greeting devices 300, also known as "visitor wands." The present invention provides a variety of embodiments that implement the visitor kiosk 100. Different specific embodiments can provide a variety of capabilities depending upon the configuration of components and processes that comprise the embodiment. The visitor kiosk 100 is preferably implemented using a computer, such as a personal computer (PC). The computer can have a touch screen, for example, and/or a keyboard or keypad to enable visitors to enter information. However, other input devices, such as touch pads, track devices, joy sticks, mouse and the like can also be used in various specific embodiments according to the present invention. The use of buttons on the touch screen can obviate the need for a keyboard and the like in certain applications. However, in other applications, the visitor kiosk 100 can also include a keyboard.

The user interface of the visitor kiosk 100 can use any of a plurality of different languages to communicate with the visitor. The visitor can choose a preferred language at the initial login screen. Prompts in the user interface can be supplemented with spoken directions. Music can be added to improve the visitor's experience, especially if the visitor must wait for the person to be visited. The user interface of the visitor kiosk 100 can capture the name of the visitor, the organization they represent, the purpose for their visit, and related events, such as for example, that the visitor is also in the United States to attend Comdex™. The date and time of the visit and the person to be visited can be entered manually or chosen from a list. Whether the visitor is alone, or a member of a group visiting together can also be collected by the visitor kiosk 100.

The user interface can display a greeting for visitors to view. Greetings can include a variety of types of information, such as a slide show of images or products, advertisements, updated stock values, and daily cartoons, for example. Information can be selected according to local preferences and varied depending upon the nature of the facility and the anticipated preferences of the audience. In specific embodiments, the date of a visitor's most recent previous visit is incorporated into the greeting for that visitor. The data about the visitor's prior visits can be saved locally by the visitor kiosk computer 100 in order to prepare this type of greeting for visitors. Also, this data can be used to output a log of all visits during a given time period. Such requests can be searched by a range of dates, times, company names, persons to be visited, and the like, for example.

Figure 2:
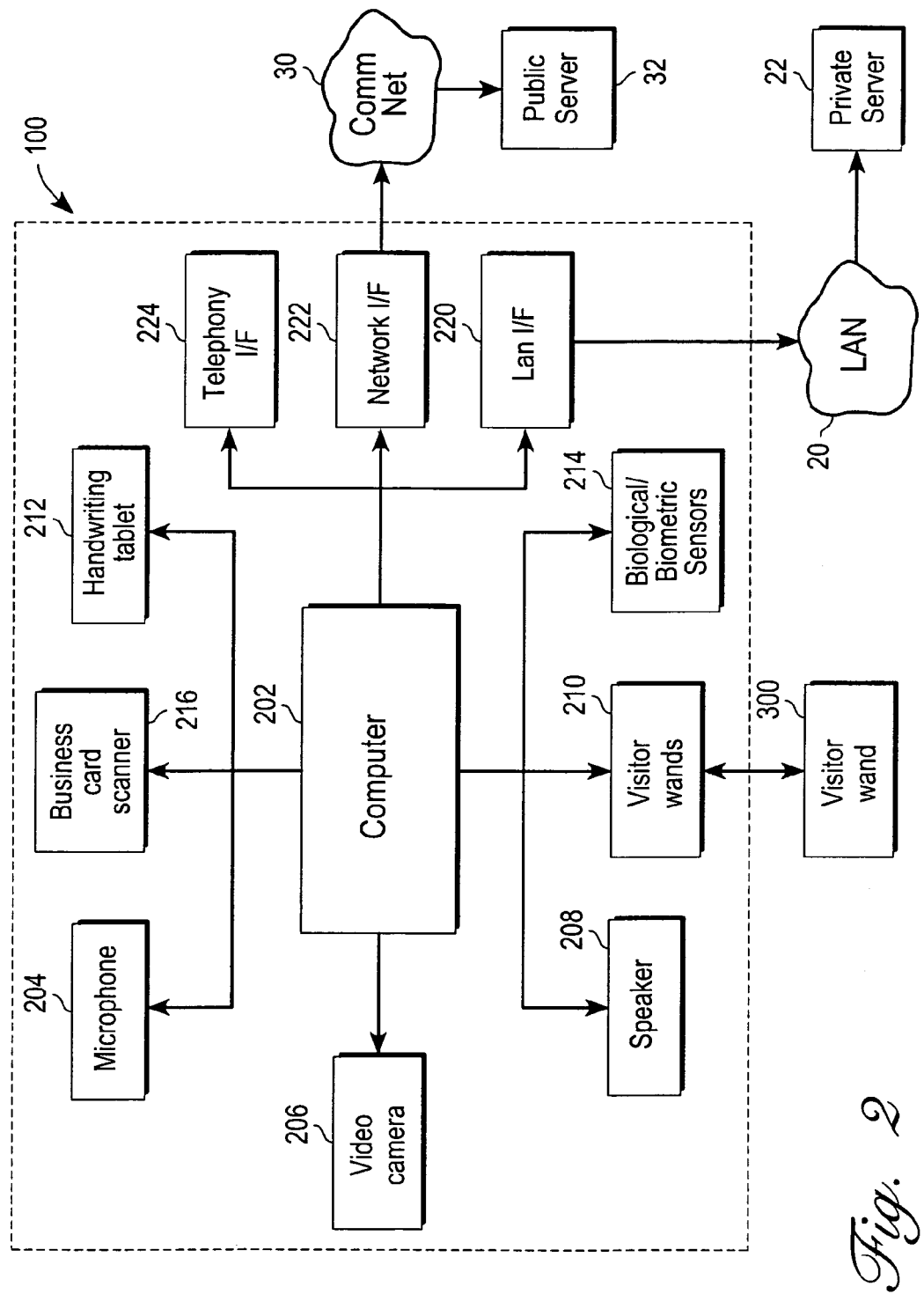
FIG. 2 illustrates a block diagram of a representative visitor greeting and information collecting apparatus in a specific embodiment according to the present invention.

FIG. 2 illustrates a block diagram of a representative visitor greeting and information collecting apparatus in a specific embodiment according to the present invention. FIG. 2 illustrates various components and interfaces of the visitor kiosk 100 of FIG. 1. FIG. 2 illustrates representative visitor kiosk 100 integrated into a visitor information system. The visitor kiosk 100 is enclosed by a dashed line in FIG. 2. Visitor kiosk 100 includes a computer 202 connected with a variety of sensors, input/output devices, and interfaces. For example, computer 202 exchanges information with a microphone 204, a video camera 206, a speaker 208, a docking station for visitor wands 210, a handwriting tablet 212, one or more biological or biometric sensors 214, and a business card scanner 216. Some specific embodiments include a subset of these components, while other specific embodiments can include elements other than those depicted in FIG. 2. Also, kiosk 100 can include various devices that are not shown by FIG. 2, such as, for example a computer touch screen, an optional keyboard, a mouse, trackball, touch pad, a combination thereof, or other types of input devices can be incorporated into kiosk 100.

The microphone 204 captures samples of the visitor's speech. This can be done without the visitor's knowledge, which is known as "unconscious capture." Alternatively, the visitor's speech is sampled after obtaining prior permission, in which case the audio capture capability of microphone 204 is activated after asking for, and receiving, the visitor's permission. Microphone 204 can capture anything the visitor might say while standing near the kiosk. In specific embodiments using conscious capture, the visitor is asked to "Please say your name," for example. The recorded audio can be forwarded to the person being visited, in order to help identify the visitor. The audio data can also be saved and used as training data for other algorithms that can identify speakers in unlabeled audio tracks or to recognize the words that the visitor spoke. For further description of techniques for identifying individuals based upon audio data, reference may be had to a U.S. Pat. No. 5,946,654, issued to M. J. Newman, L. S. Gillick, and Y. Ito, entitled, "Speaker identification using unsupervised speech models," which is incorporated herein by reference in its entirety for all purposes.

Video camera 206 provides interactive information gathering with the visitor. For example, the visitor can be asked whether she would like her picture taken. If the visitor responds in the affirmative, she poses in front of the camera and presses a "Take" button when she is ready for the system to capture her picture. In some embodiments, the camera captures a short video clip. The clip can be captured in a time window around the time when the "Take" button is pushed, for example. A "best," i.e., most web-framed single frame from the clip, can be chosen to represent the visitor. In alternative embodiments, the video capture is performed without the visitor's awareness. This is known as "unconscious capture." Embodiments employing unconscious capture obviate the need for a "Take" button. Further, such embodiments capture an image of each visitor that signs-in at the kiosk. A video clip can be captured starting when the visitor first started logging in until shortly after they were finished, for example. Both the clip and the best single frame from the clip can be saved.

In specific embodiments, more than one camera is used in order to capture images of the visitor from different perspectives. For example, one of the cameras can be aimed to grab a frontal view full-face image. Other cameras can be deployed in the area nearby the kiosk and can be aimed to gather clips of the visitor viewed from different angles. A wide angle view taken from a location that is a known distance from the visitor enables the system to determine the visitor's height. The video clips can be used later to help identify the visitor in other environments. If the clips show the visitor walking across the room, the visitor can be identified using known techniques that demonstrate how people are often identifiable from a combination of their height, body shape, posture, and gait. For further description of techniques for identifying individuals based upon these features, reference may be had to a publication by D. Cunado, J. M. Nash, M. S. Nixon, and J. N. Carter, entitled, "Gait extraction and description by evidence gathering," Proceedings of the Second International Conference on Audio and Video-based Person Identification, Washington, D.C., Mar. 22–23, 1999, 43–48, which is incorporated herein by reference in its entirety for all purposes.

In a specific embodiment, a plurality of close-up images of a visitor are combined to generate a three-dimensional representation for the visitor. One specific embodiment employs a software product of Avatarme, Ltd. (www.avatar.com) to generate a three-dimensional representation of the visitor that can be used to identify the visitor later in other environments.

The information captured by the visitor kiosk can be used to identify the visitor at other office appliances. This provides automatic identification for visitors at devices using unconscious capture. In specific embodiments, once the visitor kiosk supplies information about a visitor to other devices in the facility, these devices can draw upon this information later to identify the visitor. Thus, according to an embodiment of the present invention, a copy machine in the facility can recognize that a specific visitor is requesting copy services based upon the identification information gathered about the visitor at the visitor kiosk. The visitor kiosk can combine information about a particular visitor's authorization to use certain devices to the networked machines in the facility. These machines, upon recognizing the visitor, will determine whether the visitor is permitted to access that particular machine.

The speaker 208 can enable the kiosk to play pre-recorded greetings. These can be generic greetings like, "Welcome to the Ricoh California Research Center," or they can be tailored to individual visitors. For example, after scanning a business card for Mr. X, the kiosk can greet the recognized visitor with, "Welcome to Our Company, Mr. X." In specific embodiments, instructions for a visitor are read aloud. A computer synthesized voice, which can be provided by "DECtalk," a product of Digital Equipment Corporation, for example, or by pre-recorded audio clips, can be used to provide the speech. The kiosk 100 can also play music before or after a visitor signs in or at different points during the sign-in process.

The docking station for visitor wands 210 provides a connection to visitor wands 300. Visitor wands can be used as identity badges, for example. Each visitor can be provided with a visitor wand and invited to carry it while visiting the facility. In specific embodiments, the visitor wand can record the visitor's location, who the visitor meets with, and what is said during those meetings. This information can be compiled into a "visitor's diary," a record of the visitor's experience at the facility. The docking station for visitor wands 210 provides information about the times when wands are removed and replaced. In conjunction with the user interface software of the visitor kiosk, the identity of the visitor possessing each particular visitor wand is tracked. The docking station also provides a mechanism for downloading data to and uploading data from a visitor wand. Visitor wands will be described in further detail herein below with reference to FIGS. 3A–3C.

Handwritting tablet 212 captures the signature of the visitor at the kiosk, acting as a replacement for the sign-in sheet of conventional receptionists. The visitor is prompted by the user interface to write her signature on the tablet. Preferably, a pressure-sensitive tablet is used. However, other types of writing tablets are used in various specific embodiments. The handwriting tablet captures the sample of the visitor's signature to enable accurate verification of the visitor's signature subsequent to the visit. For a detailed description of techniques for identifying individuals based upon handwriting, reference may be had to a publication by R. Plamondon and G. Lorette, entitled, "Automatic signature verification: The state of the art," Pattern Recognition, 22, no. 2, 107–131, 1989, which is incorporated herein by reference in its entirety for all purposes.

Biological and biometric sensors 214 interfaced to the kiosk computer 202 provide data that can be used for subsequent biometric identification of the visitor. Biological and biometric sensors 214 collect information associated with a person's body functions, such as a persons weight, a body temperature, a heart rate, a respiratory rate, one or more fingerprints, and an odor. In a specific embodiment, weight is measured using a pad in front of the kiosk. Fingerprints are read through a special mouse, space bar on the keyboard, or touch screen. For a detailed description of techniques for measuring weight, reference may be had to a publication by M. D. Addlesee, A. H. Jones, F. Livesey, and E. S. Samaria, entitled, "The ORL Active Floor," IEEE Personal Communications, Vol. 4, No. 5, October 1997, pp. 35–41 (ftp://ftp.uk.research.att.com:/pub/docs/att'tr.97.11.pdf), which is incorporated herein by reference in its entirety for all purposes.

In specific embodiments, biometric identification and/or visitor wand identification is used to identify the visitor's presence at a networked office machine, such as a copier, printer, facsimile machine, or the like. Visitors with permission to use the machine are recognized by comparing the visitor's biometric information with a known biometric "signature" for the visitor and authorization information gathered by the visitor kiosk 100. Unconsciously captured images of the documents the visitor processes with the office machine can be sent to the visitor at the end of the visit.

The emotional state of the visitor can be recognized from a combination of biological measurements. Techniques for inferring an emotional state from biological measurements are known in the art. The visitor's emotional state can be determined, and the results communicated to the persons being visited. This information can assist persons being visited in responding to unspoken needs of the visitor. For example, someone who is nervous because she is worried about something at home might enjoy an opportunity to make a telephone call. Accordingly, knowing the visitor's emotional state enables persons at the facility to take action to reassure the visitor.

The business card scanner 216 interfaces to the kiosk computer 202 and resides proximately with the visitor kiosk 100. Event-based software within the user interface of kiosk computer 202 controls the operation of the business card scanner 216. At an appropriate time while interacting with a visitor, the visitor inserts her business card into the scanner. This is detected and the scanner's operation is started. An image of the business card is obtained and saved. An optical character recognition (OCR) program is applied to the image either locally by the kiosk computer or remotely at the server 22. The result of the OCR is displayed to the visitor by the interface software of kiosk computer 202. Fields such as the visitor's name are detected by the OCR and used by the user interface to address the visitor. Visitors can be asked to confirm the OCR results with a prompt on the display screen, or through a voice message, or the like. In specific embodiments, a two-sided business card scanner is used. These embodiments provide the capability to input information from foreign language business cards, such as for example, those used in Japan, in which English and Japanese text appear on opposite sides of the business card. The OCR software can detect which language is present and automatically apply the appropriate algorithms.

A variety of interfaces can connect the kiosk 100 to computer systems, networks, and the like, in order to provide information to persons in the facility. A local network interface 220 enables communication between the kiosk 100 and client computers and other devices on the local network 20, which can be a local area network (LAN), for example. The local network interface 220 connects kiosk 100 to a private server 22 via the local network 20, for example. The private server 22 can be a company internal use only computer accessible only to employees within the facility, for example. Private server 22 provides a convenient place to store information about visitors, which has been gathered from one or more kiosks deployed in one or more facilities. A browser (not shown) can access the visitor information on the server 22. A variety of devices (not shown) can communicate with kiosk 100 via network 20, such as a networked copier, such as the eCabinet product by Ricoh, facsimile machines, computers, and the like, for example.

A network interface 222 connects the kiosk 100 to a publically accessible network 30 for communications with the public. The network interface 222 provides communications between the kiosk 100 and publically accessible resources, such as sites on the world wide web. A public server 32 is connected to kiosk computer 202 via the network 30, network interface 222, and a firewall software application (not shown) to provide the public access to specific information about the visitors and/or the facility, for example. A web browser (not shown) can provide the interface to this information.

A telephony interface 224 provides a telephone connection via the public switched telephone network (PSTN or POTS). The telephony interface 224 provides the capability to persons within the facility to provide information to, and receive information from, the kiosk 100 by telephone.

Network accessibility provides a variety of advantages in specific embodiments. For example, in one specific embodiment, a feed from the video camera at the kiosk is displayed on a computer monitor (not shown) of someone who expects a visitor. The computer monitor is interfaced to the kiosk computer 202 via the network 20, for example. Persons expecting a visitor can view the area around the kiosk for the arrival of the visitor. This enables persons at the facility to greet the visitor as soon as the visitor approaches the kiosk, thereby providing a personalized greeting, if so desired. A client monitor (not shown) can provide a real time indication of activity taking place at the keyboard and/or touch screen of the kiosk computer 202. The client monitor can include a live audio feed from the microphone 204 at the kiosk 100. In specific embodiments, the microphone 204 provides the audio feed without the visitor being aware of its operation (unconscious capture).

Many kinds of system maintenance and updating functions are enabled by the network interface. In a specific embodiment, once a visitor signs-in at the kiosk, a communication is entered into between kiosk computer 202 and server 22. In this specific embodiment, the communication is implemented using a Unix socket that is opened to a process on the server 22. Then, the kiosk computer 202 sends a message that indicates to the server 22 that a new visitor has arrived. Responsive to this message, a process on the server 22 opens an ftp connection, for example, to the kiosk computer 202 and obtains copies of the files associated with the newly arrived visitor. These files can include for example a business card image, a result of processing the business card image using an OCR, text data, a sound file, a video clip, and the like. The kiosk computer 202 can also respond to status requests made by server 22 over network 20, for example. The kiosk computer 202 tracks its performance using a variety of statistical measures, such as a date program started, a number of visitors, a date of last visitor logged in, and the like. In specific embodiments, statistical moments such as means, mode, average, standard deviation, kurtosis, and the like, known in the art track numbers of visitors, their arrival times, and the like. Then, upon request by server 22, which may be made using a socket call, for example, the kiosk computer 202 sends a list of logged events and/or statistics to the requester. The server 22 can verify that the kiosk 100 has been operating normally by analyzing the statistics sent to it by kiosk computer 202.

In a specific embodiment, the kiosk computer 202 sends email messages over the network 20. These email messages can notify persons connected to the network 20 that a visitor has arrived. These persons can identify the visitor by the email messages. Attachments such as the sound, video, and/or still images of the visitor can be appended to the emails to assist in recognizing the visitor. The kiosk computer 202 also receives email messages, which it processes as commands. For example, an email message sent to a visitor kiosk 100 at the address "kiosk@crc.ricoh.com" having "SHOW VISITORS" in the subject line will cause the kiosk to return a list of visitors and the dates that the visitors signed in at the kiosk 100. The kiosk 100 can also receive notifications of visitors to expect in this way. For example, an email message with, "VISITOR 8/22/1999 Masamitsu Sakurai," informs the kiosk computer 202 that this person is expected on August 22. In a specific embodiment, this information is used by the kiosk to post-process the results of applying OCR software to an image obtained by scanning the visitor's business card. Further, in specific embodiments, the information from the notification is used to populate the user interface. A pull-down menu, for example, is populated with the names of visitors that the kiosk has been notified to expect. When one of the visitors arrives, she can select her name from the pull-down menu. Information about expected visitors can also be used to notify persons expecting a visitor that a particular visitor did not arrive. The user interface can also be modified based on expected visitors. For example, if a visitor from a prominent company, X, is expected, photographs can be displayed on the screen that highlight the facility's relationship with company X.

In a specific embodiment, the kiosk computer 202 comprises a web server program, providing a stand-alone visitor information collection system on the network 20. In this configuration, kiosk computer 202 maintains a home page that shows the visitors processed by the kiosk 100, as well as the person(s) visited. Users can query this information based upon parameters such as a visitor name, a host name, a date or a date range, a purpose, and an associated event. For example "show me all the visitors in July who were here for the review meeting," may be submitted as a query of the information stored by the visitor kiosk 100. In one embodiment, a CGI script can be executed by the kiosk computer 202 in order to retrieve the appropriate data and display it as a web page. Expected visitors can be entered with a CGI script at the web server 22. A forms interface can allow visitors to enter the date, name, organization, phone numbers, email address, purpose for visit, expected time of arrival, and agenda. This can include the names of people in the facility and times when the visitor will meet with each one.

The network interface 222 provides connection to the world wide web via external network 30. In specific embodiments, personal information about the visitor can be gathered automatically from the world wide web. For example, a person to be visited may desire to research conversation topics of interest to the visitor. The weather during the previous few days or weeks in the town that the visitor came from, standings and recent results for the home sports teams, and the like, can be retrieved to form a "biographical profile" that can serve as a basis for conversation with the visitor. Recent cultural events, such as theatre, and the like, in the visitor's home towns can also be retrieved. Popular Internet sites, such as YAHOO™, for example, provide sources from which this data might be extracted. The weather during the visitor's previous visit, as well as a list of significant news stories at that time might be provided if the visitor is making a return visit to the facility. This information can be transmitted to the person to be visited via an email message before the visitor is scheduled to arrive.

The compilation of biographical information can also include security related information, which may be useful in cases where the visitor has not previously visited the facility. For example, searching online newspapers for the visitor's name can answer a plurality of security related questions. Did the visitor recently write a letter to the Editor? Was the visitor arrested recently? Is the visitor on the FBI's ten most-wanted list? Should Security be alerted? Newspapers in the town where the visitor is from can be searched for recent locally significant news stories. Further, one or more databases can be searched for the visitor's name. These databases include readily available archives of genealogy information, ham radio licensees, aircraft pilots, department of motor vehicles (DMV) data, such as driver's licenses and registrations, voter registration, property ownership and tax roles and various criminal registries.

Visitor information obtained from the world wide web and other external sources can be augmented with information stored in a database residing on server 22, or directly on the kiosk computer 202, about the visitor's personal interests. This information can also be entered with an "expected visitor" web form. For example, information about the kind of car a visitor drives, the visitors hobbies (e.g., golf), what the visitor likes to eat, and where the visitor was taken to lunch or dinner during the previous visit can be incorporated into the biographical profile of the visitor. This can be compared with an online restaurant guide to determine suggested resturants to take the visitor during her stay. A history of the visitor's hotel stays can be used to suggest where the visitor should be housed.

The public server 32 that is connected to publically accessible communication network 30 enables the world wide web to be used as a focal point for follow-up communication with visitors. As described herein above, a visitor is assigned a web page upon visiting the facility. Each time the visitor comes to the facility, the web page is updated with a record of the most recent visit. Information such as whom the visitor met with, (with or without images), meeting notes, and the like, is posted on the visitor's web page. Other information could also be included, such as for example, what the weather was like the day of the visitor's last visit, what the headlines were, and the like. In addition, any technical reports or literature that the visitor received during the visit can be posted to the web page. In embodiments employing an extranet, a person inside the company can securely share selected information with a customer by posting the information to that customer's web page. This can be useful beyond mere face-to-face visits, and can be extended to cover any ongoing relationship, even if initiated via email or telephone. Specific embodiments can provide the persons being visited with a mechanism to control distribution of information by tracking whom they met with and what was discussed. Further, specific embodiments can assist the forgetful visitor with remembering what was discussed in meetings held during the visit.

The telephony interface 224 provides the capability to contact visitors and persons to be visited by telephone. When a visitor registers at the kiosk and indicates who they are visiting, the person to be visited can be contacted by telephone. The kiosk notifies them that a visitor has arrived. If the person to be visited does not answer, a designated alternate is telephoned. The kiosk plays a pre-recorded message to the person to be visited or the alternate. If the name of the visitor is available (from the business card OCR results or if it was manually entered), it can be incorporated into the message by a speech synthesizer. The telephony interface also enables the kiosk to act as a speakerphone. If the person to be visited answers the telephone call from the kiosk, a connection is opened with the visitor. This allows the host to greet the visitor and let the visitor know that the host will arrive at the kiosk shortly to escort the visitor in the facility. A video link can also be added to the interface to make this communication a video conference.

In some embodiments, the kiosk 100 also receives telephone calls via telephony interface 224. In these embodiments, the kiosk 100 is equipped with a touch tone interface that enables the caller to execute various options. One option is to check the status of expected visitors. Another option is to leave a voice message for an expected visitor, which can be played when the visitor arrives. The host for a visitor can be changed and an expected visitor can be added or deleted using a touch tone interface.

In specific embodiments, security devices (not shown), such as a metal detector or an explosives detector can be incorporated to the kiosk. These embodiments can provide greater security to persons working in secure areas. In a specific embodiment, a detector for RF transmission or reception can detect the presence of listening devices on the visitor. A detailed description of various examples of commercially available sensors useful in creating certain specific embodiments may be had by referring to, "The Spy Store" (http://www.thespystore.com).

In specific embodiments, a printer (not shown) interfaces with visitor kiosk 100. In certain specific embodiments, the visitor receives a printed "receipt" from the printer after signing in with the kiosk. The receipt can include a URL assigned uniquely to the visitor. The URL points to the web page created for the visitor, which can be located on the public server 32. The web page provides a place to access information collected about the visitor and the visit. Other potentially useful information can be printed on the "receipt," such as what has changed since the visitor's last trip to the facility.

The operation of these and other components of specific embodiments according to the present invention will be discussed in greater detail below. In various specific embodiments, not all of these components will be present. Yet further, in many embodiments, other components can be included. These modifications will be readily apparent to those of ordinary skill in the art.

Figure 3A:
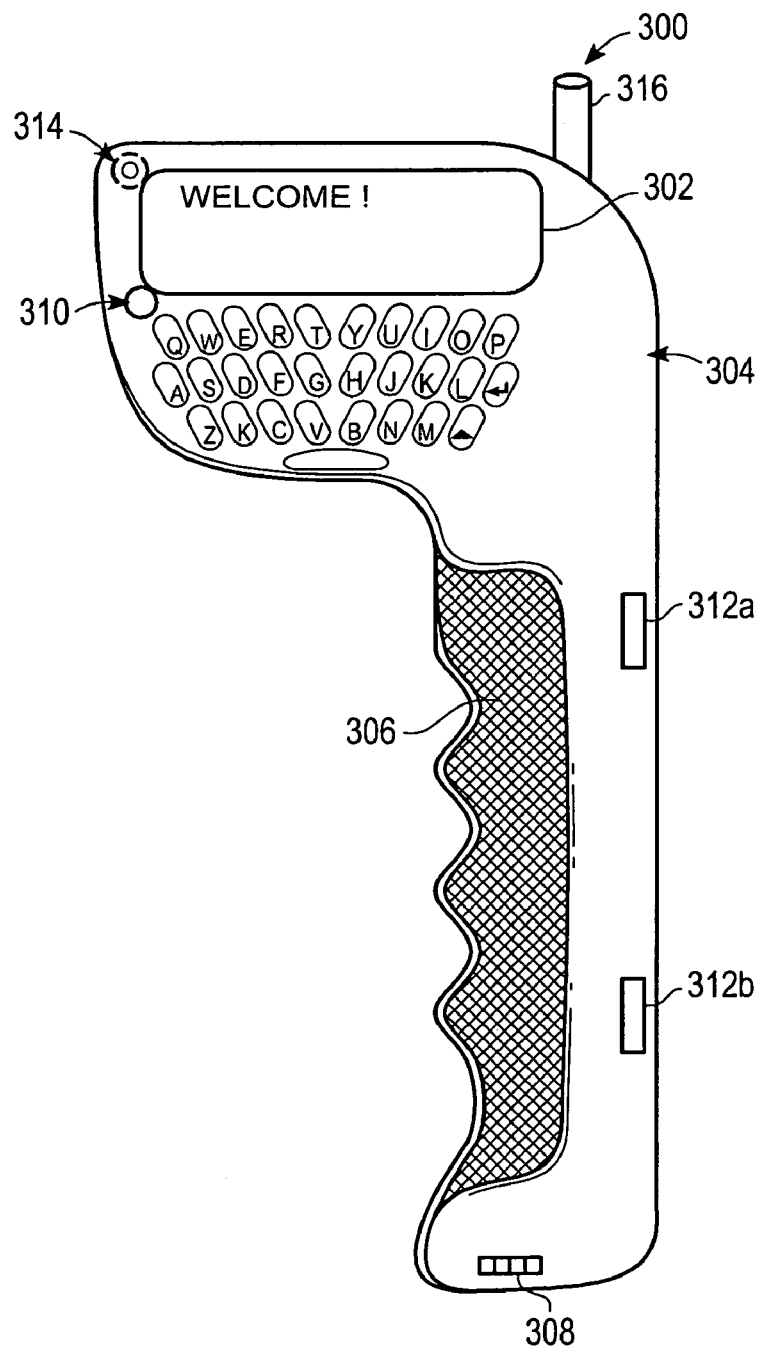
FIGS. 3A–3C illustrate representative visitor wands in various specific embodiments according to the present invention.

FIG. 3A illustrates a visitor wand in a specific embodiment according to the present invention. Visitor wand 300 illustrated in FIG. 3A is embodied as a hand held device having a display area 302 for providing messages to the visitor and displaying to the visitor entries made using a keypad 304. In the embodiment illustrated in FIG. 3A, the keypad 304 comprises a "qwerty" style key arrangement. However, other arrangements, including subsets and supersets of the "qwerty" key layout, are used in other specific embodiments. A hand grip 306 provides comfortable contour to the visitor's hand. A video camera 310 is incorporated into the wand in certain embodiments. A plurality of biometric sensors 312*a* and 312*b* can detect biological information about the visitor, such as heart rate and the like. Visitor wand 300 can guide the visitor in the facility. An itinerary for the visitor can be stored on visitor wand 300 prior to the visitor's arrival. The visitor wand 300 then displays the itinerary together with directions for the visitor at specific intervals during the day. For example, at 10:00 AM, visitor wand 300 might display the message, "take the elevator to the fourth floor, turn right, walk 50 feet to room 561." An alternative is to display directions graphically using a map.

The visitor wand 300 further comprises an audio recorder. A microphone 308 and audio recording circuitry (not shown) provide the capability to save a copy of notes from meetings that the visitor attends as she travels through the facility. Recorded information can be stored in the wand 300. The recordings can be parameterized by the identity of the persons to be visited, computed as described above. This allows easy retrieval later, either by the visitor or the person to be visited. For example, the visitor may wish to make queries like "please retrieve the conversation I had with Ms. X on August 9."

The video camera 310 is incorporated into the wand 300 in order to record the visitor's activities and experiences while at the facility. Its record can be supplemented with still images or video clips captured from other cameras in the facility. For example, an image from the camera in a particular room can be captured and saved on the wand, or alternatively on a server, when the visitor is in that room. For a detailed description of a technique for capturing video recordings, reference may be had to a publication by M. Eldridge, M. Lamming, and M. Flynn, entitled, "Does a Video Diary Help Recall?" Technical Report EPC-1991-124, published in People and Computers VII, A. Monk et. al. (ed.), Cambridge University Press, 1992, pp. 257–269.

Biological sensors 312*a* and 312*b* detect heart rate, heat, odor, and the like. These sensors can help identify the wand user and help detect if a wand is passed from one person to another. Sensors 312*a* and 312*b* can also detect biometric data from which the emotional state of the visitor can be determined. This information can assist persons at the facility in improving the experience of the visitor. For example, a visitor who is determined to be excessively nervous can be offered a cup of herbal tea.

In specific embodiments, an inertial sensor (not shown) can be incorporated into the wand. For a detailed description of techniques for sensing inertia, reference may be had to a publication by Marc A. Viredaz, entitled "The Itsy Pocket Computer Version 1.5:

User's Manual," Technical Note TN-54, Compaq Western Research Laboratory, July 1998, which is incorporated herein by reference in its entirety for all purposes. It can indicate when the wand was stationary for long periods of time. This might indicate the visitor removed it from his person.

In specific embodiments, visitor wand 300 maintains a wireless communication with one or more transceivers located in the facility using an antenna 316 coupled to internal communications circuitry (not shown). Visitor wand 300 can comprise circuitry (not shown) that enables it to determine a distance to other transceivers in the facility. The facility is equipped with a multiplicity of fixed transceivers, from which the wand 300 determines its position by triangulation. This positional information is also transmitted by the fixed transceivers to a common point, such as kiosk 100, which serves as a "base" station.

The microphone 308, speaker 314, antenna 316, and associated circuitry (not shown) provide telephone functionality to the wand. A visitor can contact a person to be visited using the telephone by scrolling a cursor to the person's name in the display 302 and pressing a button in keypad 304. The visitor wand establishes a telephone connection with the selected person. Similarly, a person to be visited can contact a visitor by calling the phone number of the wand that the visitor was issued. This number is recorded by the kiosk computer 202 and communicated to the person to be visited listed in the visitor's itinerary. The number can be posted on a web page accessible using the network 20, as well.

Figure 3B:
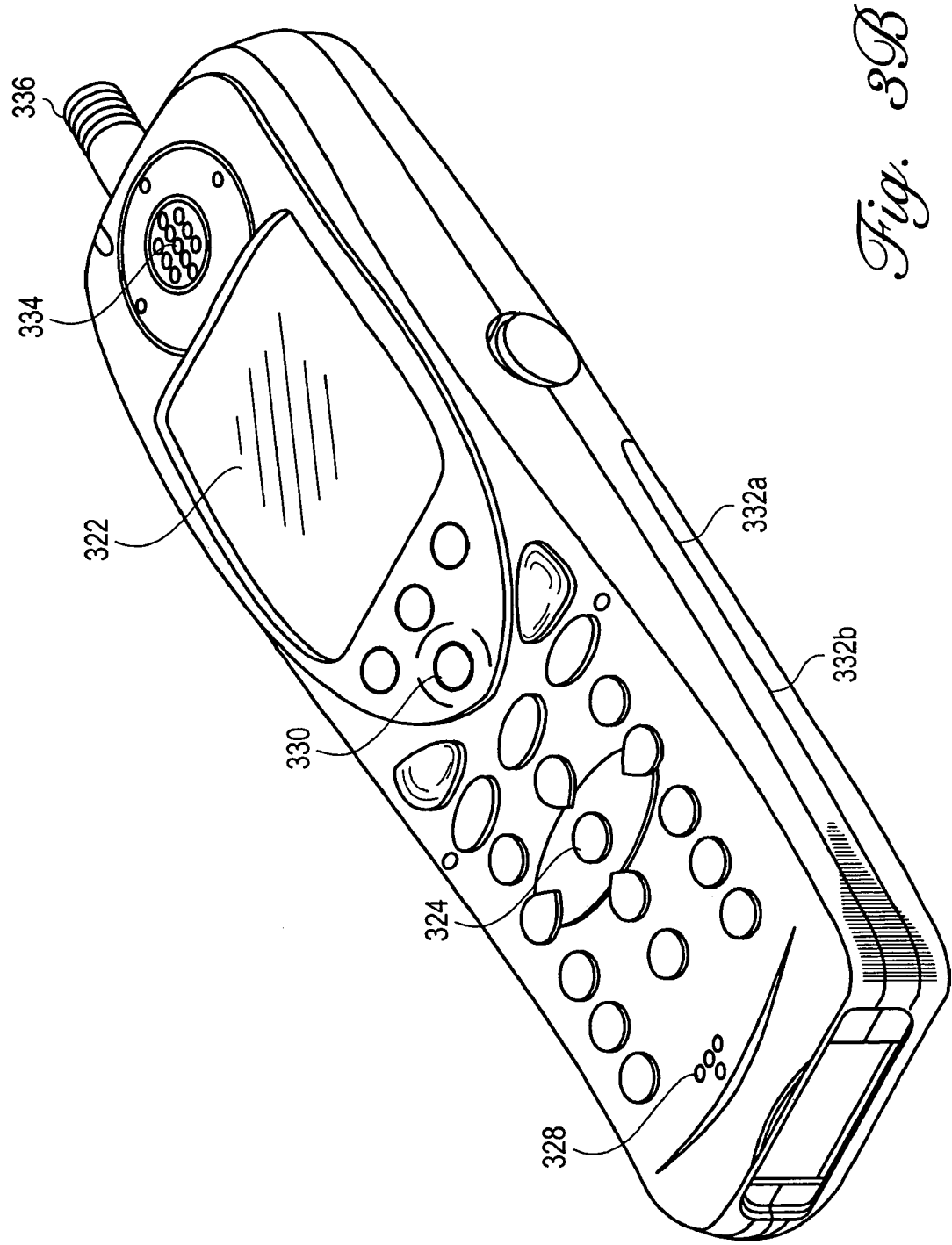

FIG. 3B illustrates a representative visitor wand in an alternative embodiment according to the present invention. Visitor wand 320 illustrated in FIG. 3B is embodied as a hand held appliance having cellular telephone communications capability. Wand 320 has a display area 322 for providing messages to the visitor and displaying to the visitor entries made on a keypad 324. In the embodiment illustrated in FIG. 3B, the keypad 324 comprises an alphameric style key arrangement. However, other arrangements including subsets and supersets of a standard "qwerty" key layout are used in other specific embodiments. A microphone 328, a speaker 334, and audio recording circuitry (not shown) provide audio input and output capability. The microphone 328, speaker 334 and an antenna 336 also provide telephone access via the wand. A video camera 330 can be incorporated into this embodiment, as well. A plurality of biometric sensors 332*a* and 332*b* can detect biological information about the visitor, such as heart rate and the like.

Figure 3C:
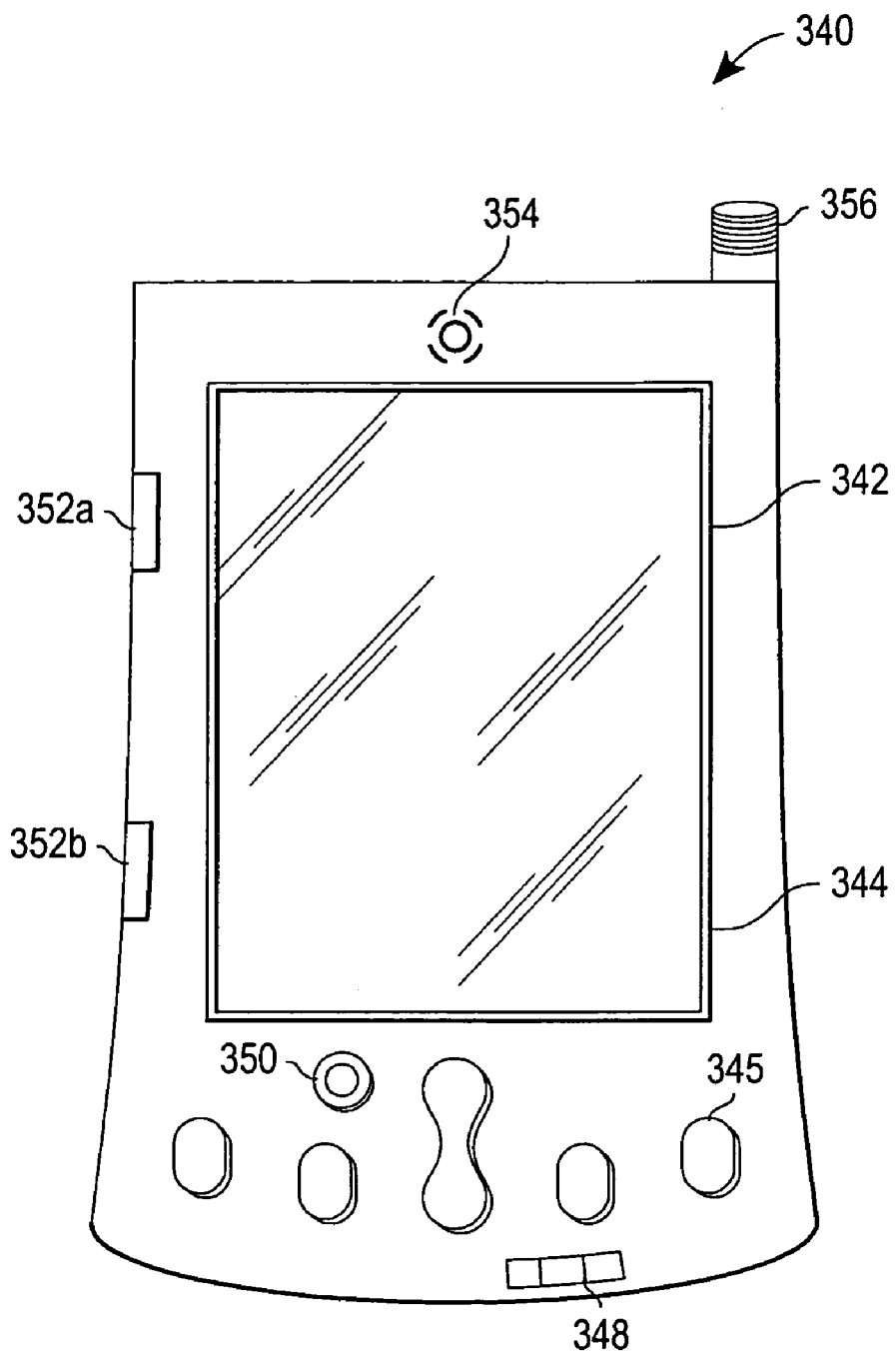

FIG. 3C illustrates a representative visitor wand in a further alternative embodiment according to the present invention. The visitor wand 340 of FIG. 3C is embodied as a personal data assistant (PDA) style device. The wand 340 comprises a digital writing pad 344 with which visitors can input data, such as notes, for example. The notes can be stored in memory of the wand 340 for later retrieval. Wand 340 has a display area 342 for providing messages to the visitor and displaying to the visitor the entries made on the writing pad 344. A microphone 348, a speaker 354, and audio recording circuitry (not shown) provide audio input and output capability. The microphone 348, speaker 354 and an antenna 336 provide telephone access via the wand. A video camera 350 can be incorporated into this embodiment, as well. A plurality of biometric sensors 352*a* and 352*b* can detect biological information about the visitor, such as heart rate and the like.

A record of whom a visitor meets with can be compiled using a triangulation technique in conjunction with a fixed physical position of persons visited. The physical position of a person can be determined from an accurate mapping between an assumed and an actual physical position of persons to be visited. This mapping can be determined from an office layout, or the like. For example, a person "A" holding a particular visitor wand, who is in the facility to visit person "B," will be located by the signal from a visitor wand in close proximity to the office of person "B." Another option is to require persons to be visited to carry a transceiver similar to a visitor wand. In this case, the person to be visited can be assumed to be the person with the wand that is physically closest to the visitor.

Microphones in the facility, not attached to the wand, can supplement the visitor wand's recording capability. These extra microphones can be attached to the fixed transceivers described above, or through some other connection. In one configuration, the wand transmits its position and the audio signal it is recording to a base station. The base station also receives audio input from other microphones in the facility. The base station determines which microphones are "active" given the physical position of the wand. The audio from each such active microphone is captured and saved. Alternatively, the audio from the microphone with a highest audio level is saved. Audio signals from multiple microphones can also be compared to verify the choice of a non-wand microphone, whenever a reduced amplitude signal from a non-wand microphone is present in the background of the sound recorded on the wand microphone. An alternative to choosing one audio track is to save more than one audio track from the set of active microphones. The N clearest signals from the active microphones might be chosen. Alternatively, the signals from all active microphones can be saved.

Figure 4:
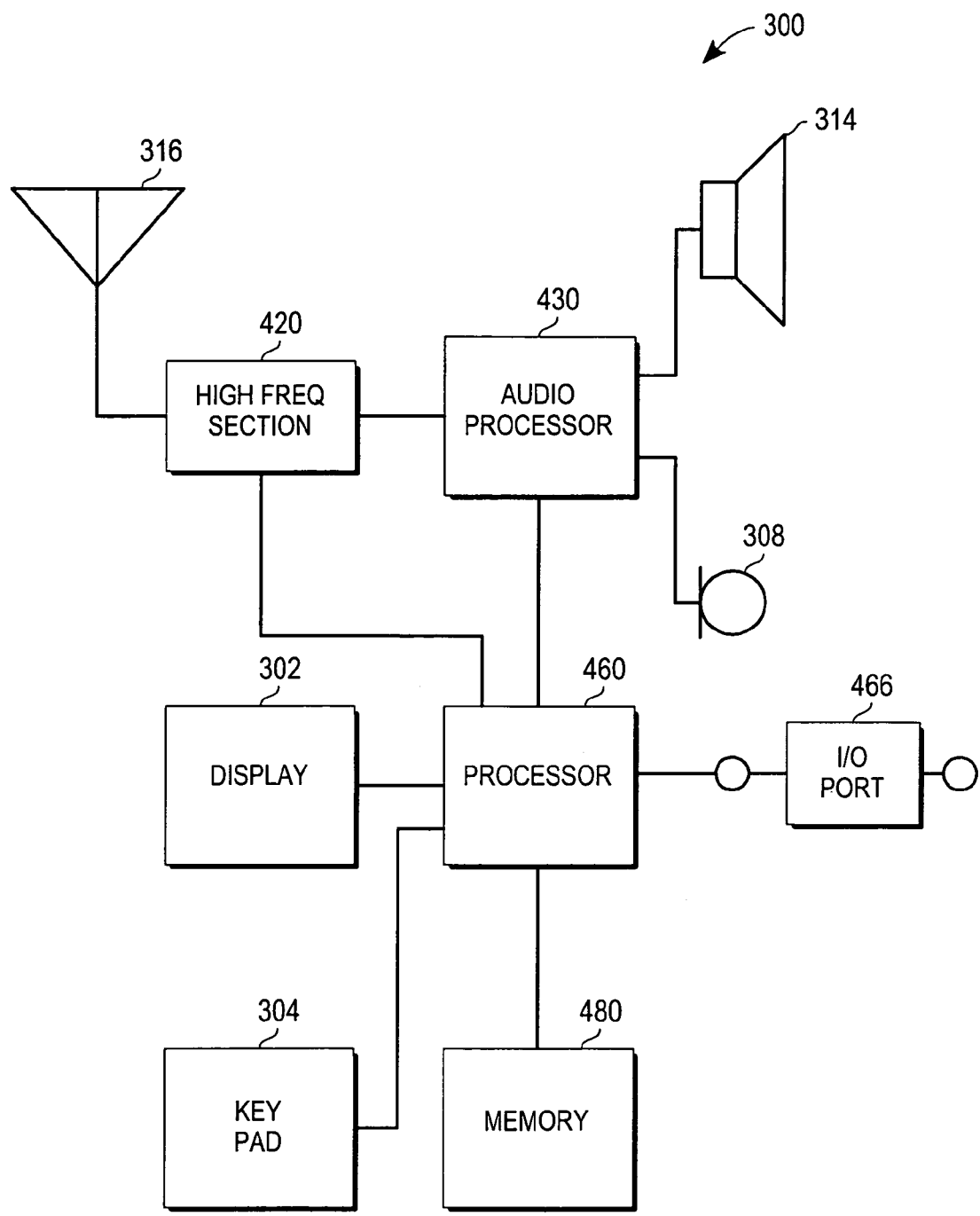
FIG. 4 illustrates a block diagram of a representative hardware implementation for a visitor wand in a specific embodiment according to the present invention.

FIG. 4 illustrates a block diagram of a representative hardware implementation for a visitor wand in a specific embodiment according to the present invention. FIG. 4 illustrates visitor wand 300 that is provided with an antenna 316 coupled to a high-frequency circuit 420. An audio circuit unit 430 connects the high-frequency circuit 420 with the speaker 314 and the microphone 308. The audio circuit unit 430 and the high-frequency circuit 420 are connected to a CPU 460 that controls various functions of the components of visitor wand 300. The CPU 460 controls the high-frequency circuit unit 420 and the audio circuit unit 430 according to a control program stored in a memory 480 that is connected to the CPU 460. Memory 480 comprises RAM, flash RAM, and/or ROM in various specific embodiments. The CPU 460 is also connected to the keypad 304 and the display 302, which provide input and output of information to/from the visitor. The CPU 460 displays on the display unit 302 information necessary for communication, such as a state of a connection, a telephone number of a person being telephoned, an e-mail addresses, e-mail data to be received or transmitted, and the like, as well as information necessary for the user of the visitor wand 300. The CPU 460 is connected to an I/O port 466, which provides interface to a plurality of sensors and devices. For example, camera 310, biometric sensors 312a, and 312b, and so forth, are connected with, and accessible by, CPU 460 via I/O port 466.

While the preceeding explanation refers to the visitor wand 300 illustrated by FIG. 3A, this explanation is intended as merely an example, and is not intended to be limiting. Further, the visitor wands of embodiments illustrated by FIGS. 3B–3C are realized using similar components and techniques as discussed above with reference to FIG. 4. Thus, further discussion of the internal hardware of these embodiments will be omitted for brevity.

Figure 5:
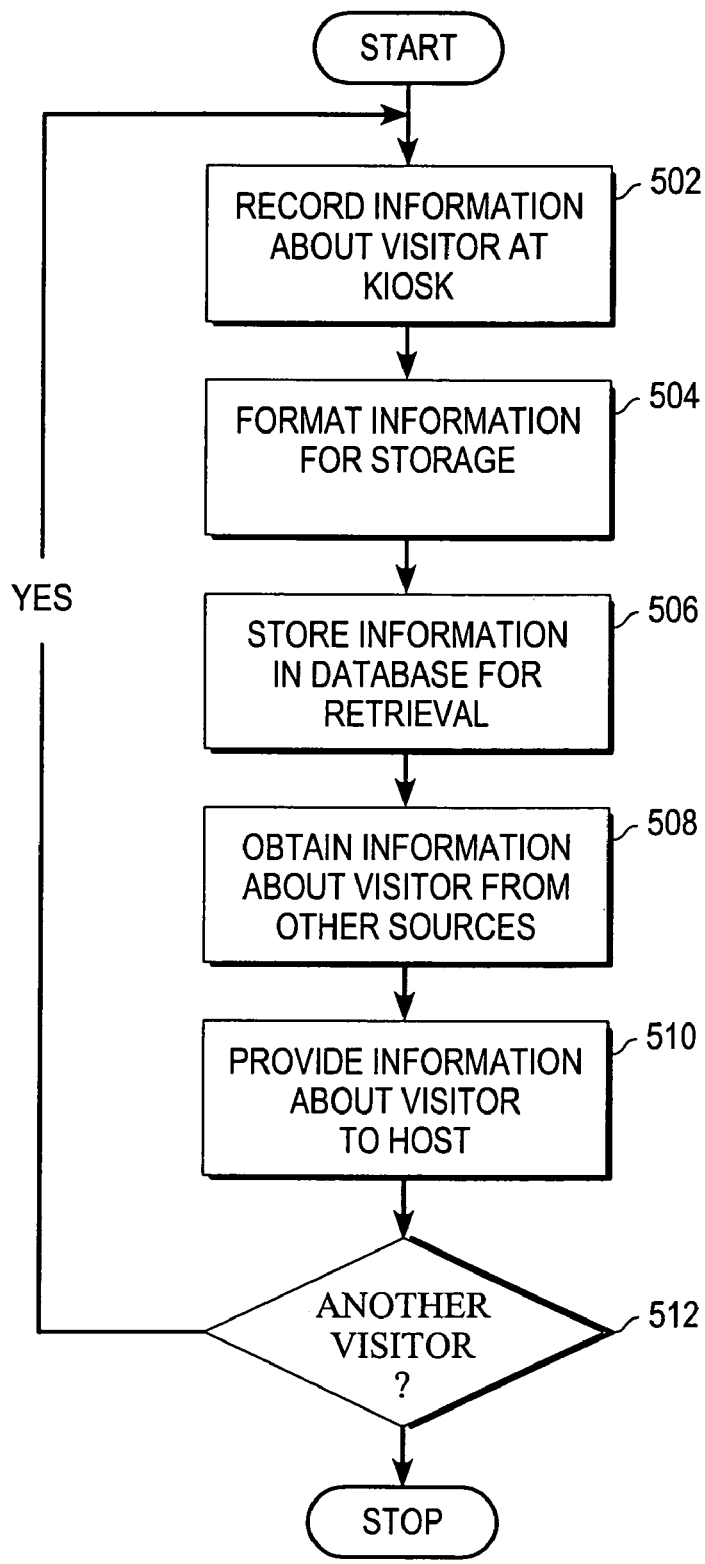
FIG. 5 illustrates a representative flowchart of processing visitor information in a specific embodiment according to the present invention.

FIG. 5 illustrates a representative flowchart of processing visitor information in a specific embodiment according to the present invention. FIG. 5 illustrates a step 502 of recording information about a visitor at the visitor kiosk 100. Then, in a step 504, the information is placed in a format for storage. In a specific embodiment, the information is placed in HTML format. However, a variety of other formats are used in specific embodiments. Next, in a step 508, the information is stored in a database. The database can be located in a sever 22 connected to the visitor kiosk 100. In another embodiment, the information can be stored locally in a database resident at the visitor kiosk 100. In a step 508, information about the visitor can be obtained from the database, as well as a variety of other sources, such as for example, the Internet, world wide web, and the like. Next, in a step 510, the information about the visitor is provided to users of the information. The users can query and retrieve the information about the visitor using their workstations, or receive information on a telephone, for example. In various specific embodiments, the order of these steps can be altered. Further, in some embodiments, not all of these steps will be present. Yet further, in many embodiments, other steps can be included. These modifications will be readily apparent to those of ordinary skill in the art.

Figure 6B:

FIGS. 6A–6M illustrate representative screens displayed during a representative greeting session with a specific embodiment according to the present invention. FIG. 6A illustrates a representative welcoming screen. Welcoming screens can comprise displays of information as part of a greeting, including a slide show of images or products, advertisements, updated stock values, and daily cartoons, for example. Information can be selected according to local preferences and can vary depending upon target audience. Here, the welcome screen includes a picture of the facility being visited 601. The visitor can select a preferred language using the touch screen, keyboard, or mouse to select from the language buttons 602.

FIG. 6B illustrates a screen presenting the visitor with a plurality of persons from which a person to be visited can be selected. In this specific embodiment, persons are indicated by selection buttons 605 having the persons' name. However, in alternative embodiments, the selection buttons can be images of the person, for example. Some selection buttons can be used to indicate a group of persons 606. In the specific embodiment illustrated by FIG. 6B, an "Unknown" button 607 and a "Restart" button 608 enable the visitor to indicate she does not know the name of the person to be visited or that she would like to begin the sign-in process again, respectively.

FIG. 6C illustrates a representative screen in which the visitor can specify a purpose of the visit. The visitor can select a purpose using a scrolling window 610. Selection can be made by moving a cursor with a mouse, trackball, or keyboard, or by using a touch screen. The visitor can indicate to the kiosk that the selection is complete using a "Done" key 611. In this embodiment, the visitor can also select a "Back" button 612, or a "Restart" button 613. In another specific embodiment, the user types the purpose for the visit manually using a keyboard.

Figure 6D:
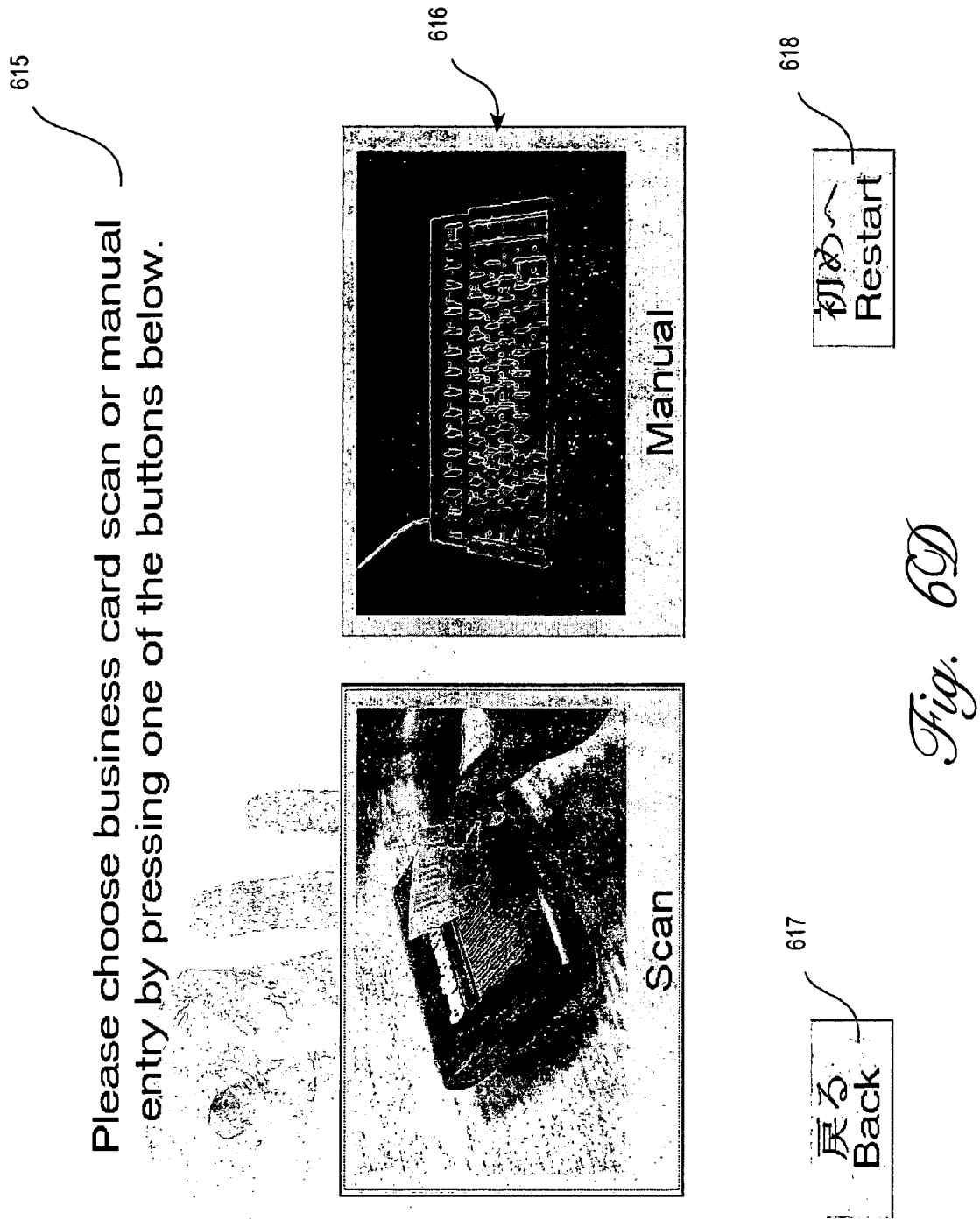

FIG. 6D illustrates a representative prompt screen to scan a business card, or manually enter the visitor's pertinent information using a keyboard. This screen provides a textual instruction 615, as well as picture examples 616, to assist the visitor in inputting a business card. In this embodiment, the visitor can also select a "Back" button 617, or a "Restart" button 618.

FIG. 6E illustrates an instruction screen for scanning the visitor's business card. This screen provides a textual instruction 620, as well as picture examples 621, to assist the visitor in inputting a business card. In this embodiment, the visitor can also select a "Back" button 622, or a "Restart" button 623.

Figure 6F:
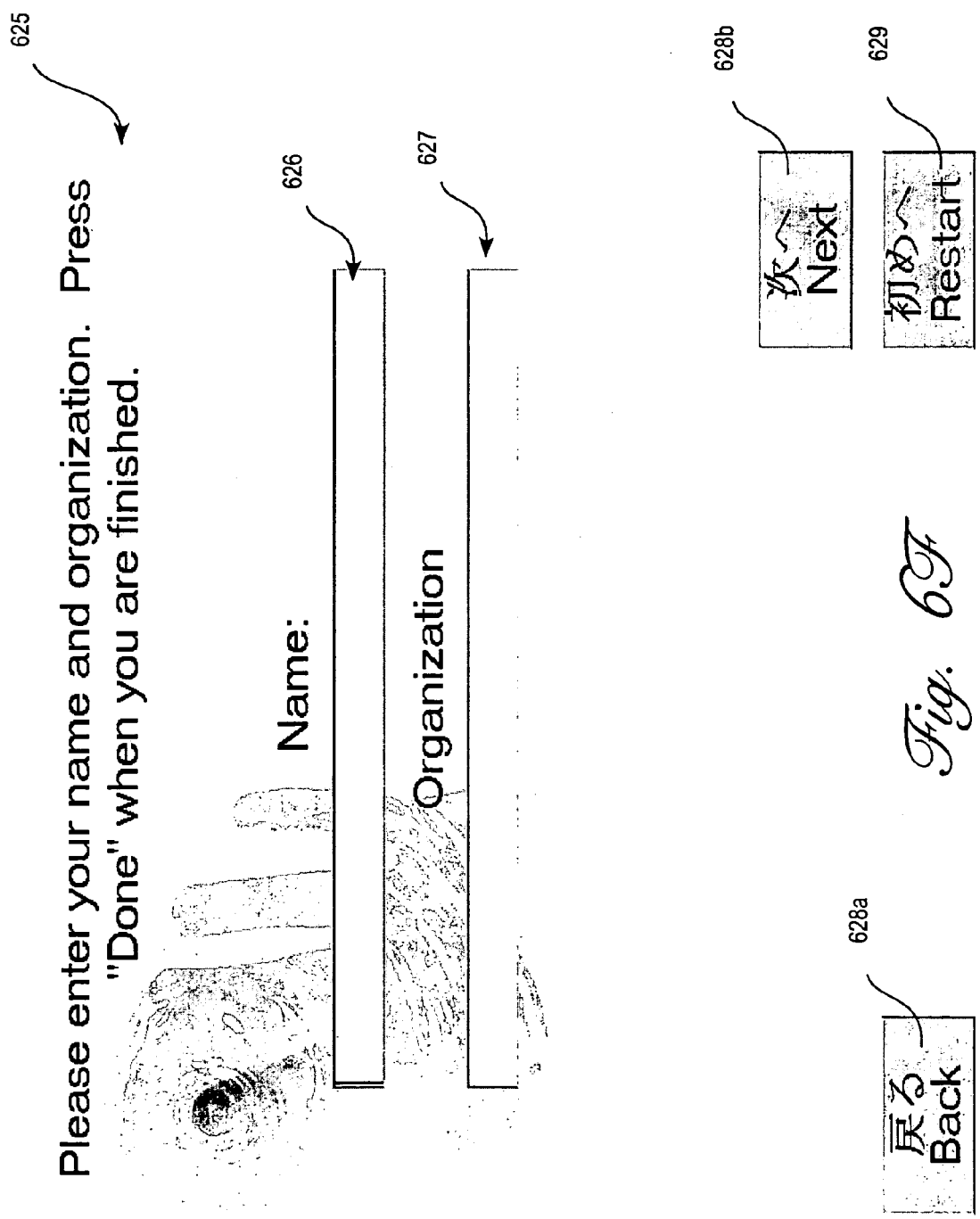

FIG. 6F illustrates representative screen for prompting the visitor to enter a name and an organization name. The screen of FIG. 6F can be displayed if the visitor has selected manual entry of this information responsive to the screen of FIG. 6D, or if the business card scanner was unable to read the visitor's business card for some reason. FIG. 6F provides a textual instruction 625, a name field 626 and an organization field 627. The visitor can enter the appropriate information into name field 626 and organization field 627 using the keyboard, for example, or other input device. In this embodiment, the visitor can also select a "Back" button 628a, a "Next" button 628b, or a "Restart" button 629.

FIG. 6G illustrates a representative screen requesting the visitor's permission to take a picture. This screen provides a textual message 630 and an image 631. The visitor can select from either a "Yes" button 632 or a "No" button 633. In this embodiment, the visitor can also select a "Restart" button 634.

FIG. 6H illustrates a representative screen showing the visitor the image provided by the camera 635. The visitor can take the picture by selecting the "Take" button 636. In this embodiment, the visitor can also select a "Back" button 637, or a "Restart" button 638. A textual message 639 prompts the visitor with instructions. In a specific embodiment, the camera 635 can capture a plurality of pictures of the visitor automatically. Then, the plurality of pictures is presented to the user so that the user can select one or more of the plurality of pictures using a mouse, or other pointing device, or the keyboard. In these embodiments, the visitor does not have to select the "Take" button.

FIG. 6I illustrates a representative results screen showing the visitor the image acquired, along with the visitor's information. The visitor may make changes to the text using an "Edit Text" button 640, or retake the picture by selecting the "New Picture" button 641. In this embodiment, the visitor can also select a "Restart" button 642. When the visitor is satisfied with the image, the visitor can select the "Done" button 643 to continue. In an alternative embodiment, the steps illustrated by FIGS. 6H–6I are replaced with a single prompt enabling the user to select from a plurality of images that are captured by the camera automatically. The images are captured automatically responsive to the visitor providing permission to take her picture by selecting the "Yes" button 632 in FIG. 6G. In this embodiment, the information gathered about the visitor is displayed 644. Optionally, the kiosk can retrieve information about the visitor's previous visit and display it as well 645.

Figure 6K:
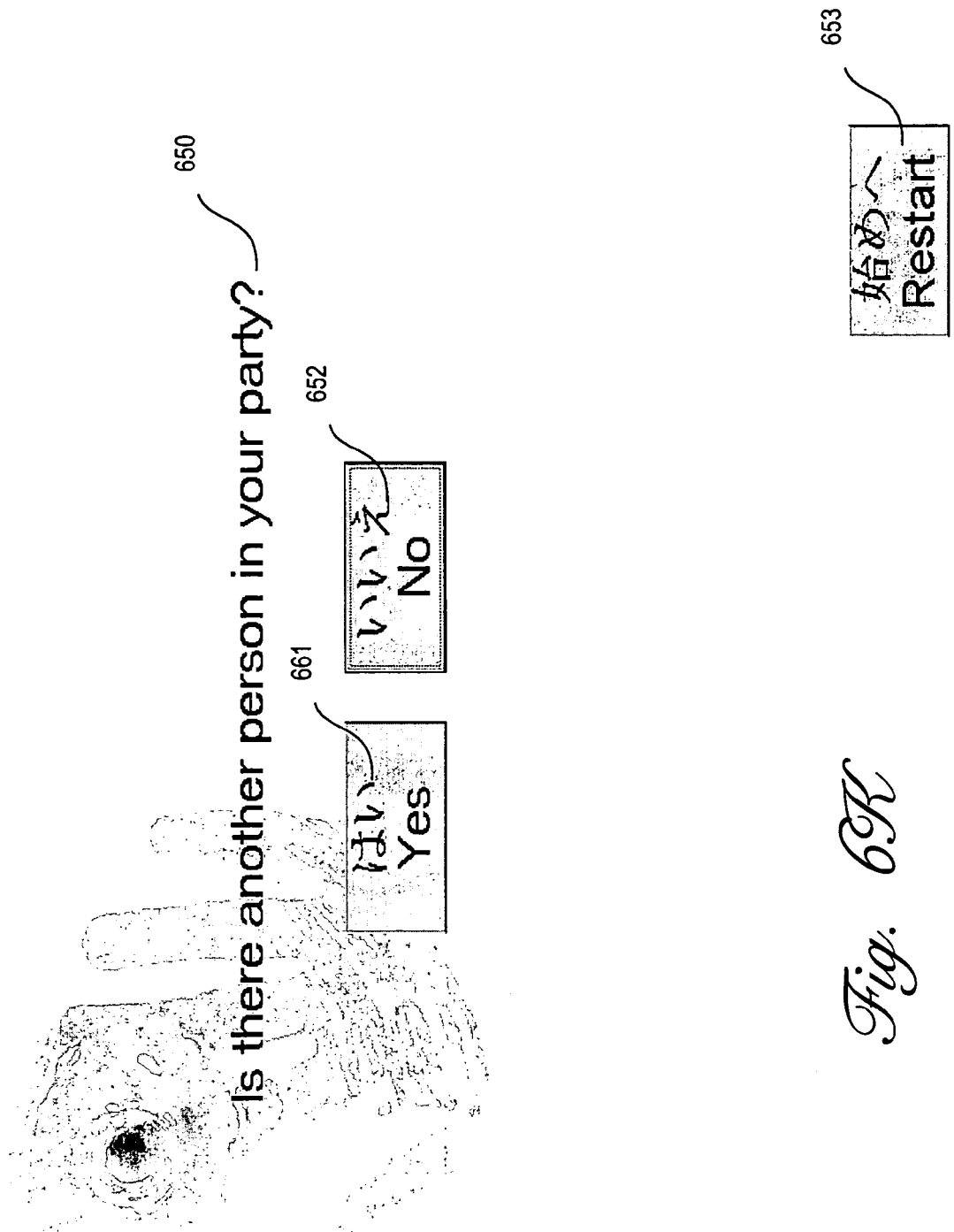

FIG. 6J illustrates a representative prompt screen for recording the visitor's speech. The visitor is invited to say her name with a text message 646. The visitor can select the "Done" button 647 when complete. FIG. 6K illustrates a representative screen prompting the visitor if another person is present with the visitor 650. The visitor can reply by selecting the appropriate button. If the visitor selects the "Yes" button 651, the next visitor is provided with the same prompts illustrated by FIGS. 6A–6K. Otherwise, if the visitor selects the "No" button 652, the welcome screen illustrated in FIG. 6L is displayed. In this embodiment, the visitor can also select a "Restart" button 653.

FIG. 6L illustrates a representative final screen displayed at completion of a session with a visitor. In this embodiment, the screen includes a textual message 655. The visitor is also provided with a last opportunity to restart the session by selecting a "Restart" button 656.

Figure 6M:
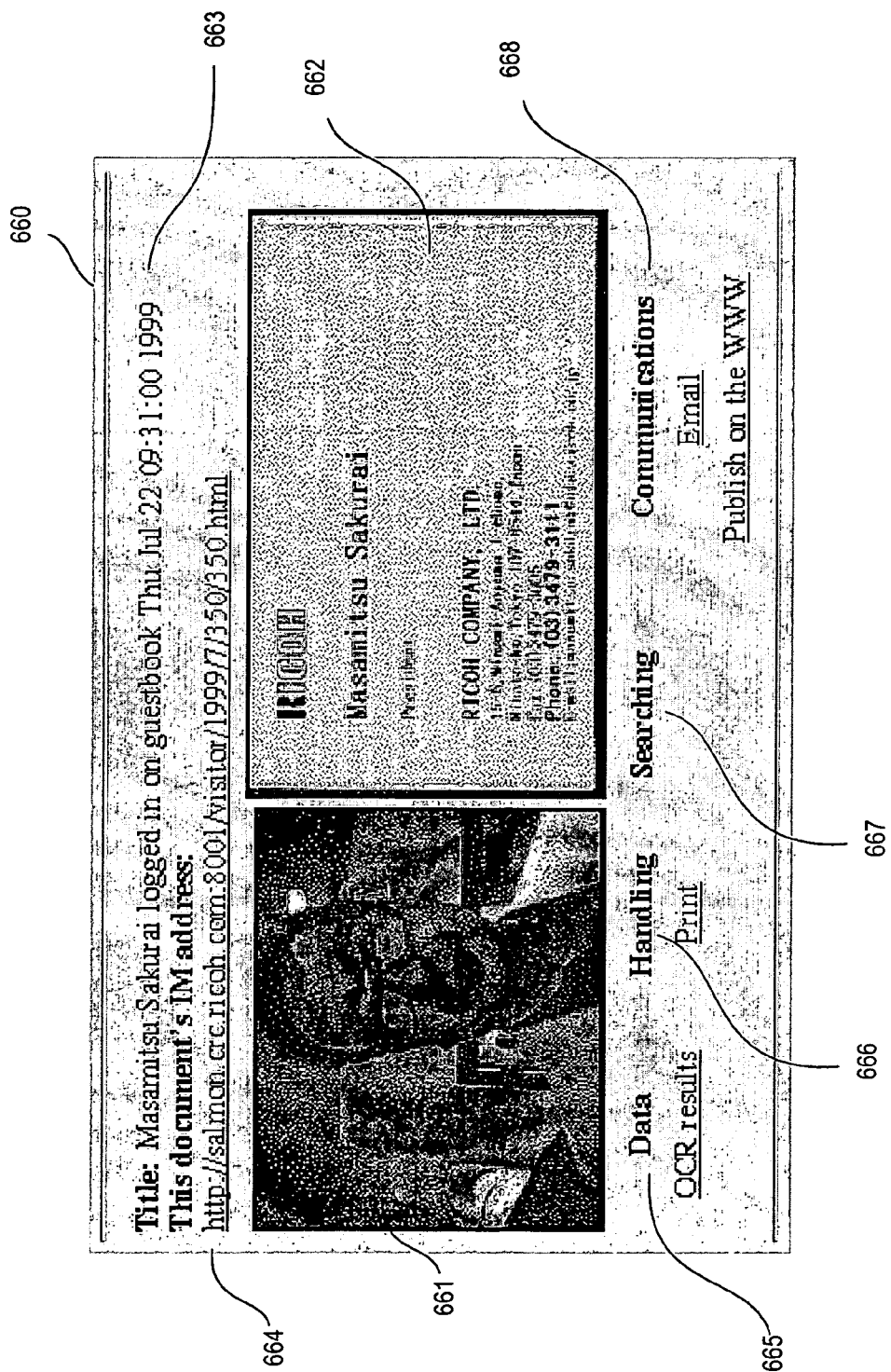

FIG. 6M illustrates a representative example HTML representation of a visitor that is created from the information gathered by the visitor kiosk 100 in a specific embodiment according to the present invention. Representation 660 comprises a digitized image 661 of the visitor, and a digitized image 662 of the visitor's business card. In some embodiments, images of both sides of a two sided business card will be included. A representative textual title 663 indicates the name of the visitor, and the date and time of the visit. A URL 664 provides the address of the web page for this visitor. A data field 665 provides a link to results of an OCR program that has been applied to the visitor's business card. A handling field 666 provides a link to a print process, which provides a mechanism for printing the visitor's information. For example, a copy of the visitor's business card image or a formatted copy of the visitor's web page information can be printed. A searching field 667 provides a mechanism for entering a search parameters for information about the visit. For example, a user can search for information about a visitor's previous visits, search for documents containing the visitor's name, or find other visitors who accompanied a particular visitor. A communications field 668 provides links to send the visitor information by email, or publish the visitor information on the world wide web. In various specific embodiments, not all of these fields will be present. Yet further, in many embodiments, other fields can be included. These modifications will be readily apparent to those of ordinary skill in the art.

FIG. 7 illustrates a representative example technique for tracking visitor wands in a specific embodiment according to the present invention. FIG. 7 illustrates visitor kiosk 100 connected by network 20 to a plurality of locators, including locators 700, 702 and 704 that are spread throughout the facility. Locators 700–704 communicate via a wireless communication link to a representative visitor wand 340. Using a global positioning system (GPS) (not shown), the locators 700–704 can determine a position of a visitor within the facility when the visitor wand 340 is in communication with any of the locators 700–704. In specific embodiments, visitor position information at various time intervals is gathered and recorded. From such data, one or more histories can be prepared. For example, a personal history for the visitor comprises where the visitor has been within the facility. Another type of history, called a location history, comprises who has visited a particular location within communication range of one of the plurality of locators 700–704. Other types of histories can also be compiled. For example, histories tracking meeting locations and/or frequency, visitor wand use, and the like are compiled in specific embodiments.

The visitor wand 340 communicates information to the locator 700. This information comprises, for example, an identifier, or business card information, a visitor name, a URL of a homepage, and the like. The locator 700 communicates information to the visitor wand 340, as well. For example, in a representative embodiment, the locator 700 communicates a locator box descriptive identifier, a locator box URL, a geographical location, such as longitude/latitude, for example, a current time of day, and the like to the visitor wand 340. In a specific embodiment, both the personal and location histories are updated with a time stamped event, such as the arrival of a visitor possessing a particular visitor wand. In the case of the personal history, the event can include details about the location. In particular, the URL of the locator box 700 enables the user to subsequently retrieve information such as attendees of a meeting other than the visitor, for example. The location history can include details about the visitor. Various specific embodiments include other types of capture devices, readily apparent to those of ordinary skill in the art, to augment these histories. For example, in a specific embodiment, a passive badge or ID card is used to implement the visitor wand 340. A variety of communications technologies can be used to provide communication between the visitor wand 340 and the locators 700–704. For example, Bluetooth™, direct connection, visual (e.g., as used by Timex™ Data Link™ watch), mobile phone, a pager or a short messaging service (SMS), magnetic card reading, infrared link, and the like provide the communications path in specific embodiments. Further, the locator 700 can connect to the Internet by a wireless connection.

Figure 8:
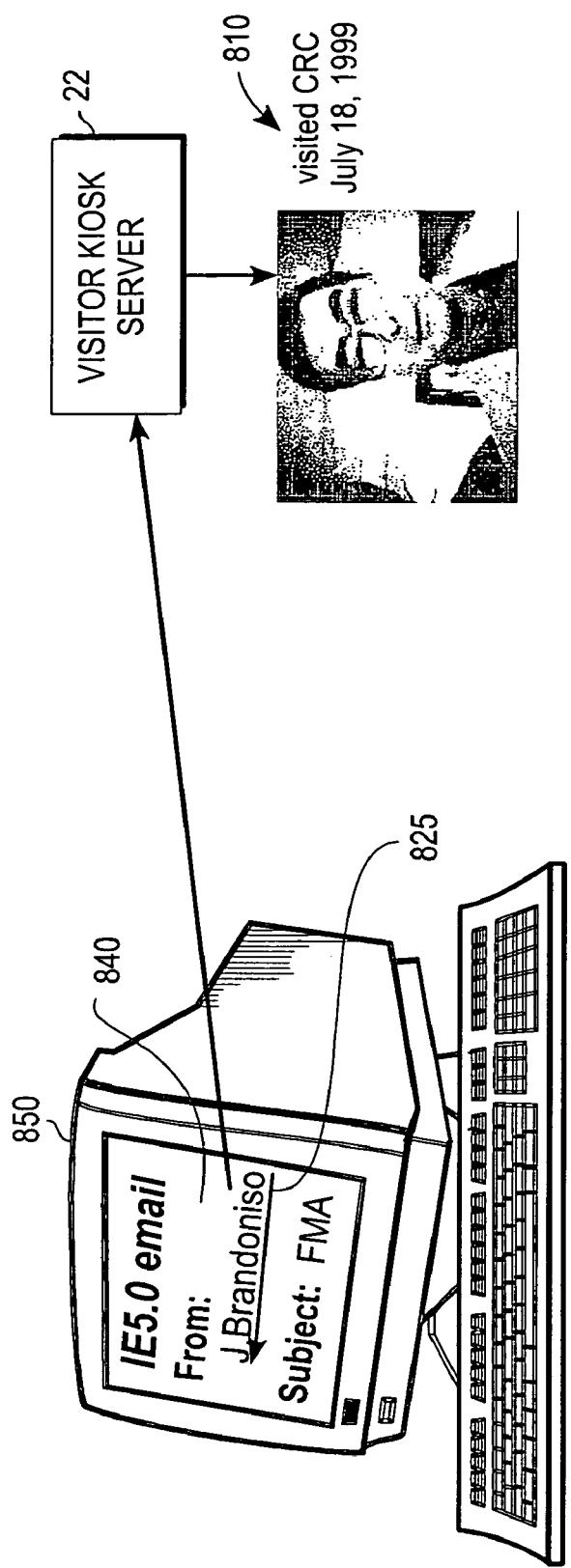
FIG. 8 illustrates a representative HTML description of a visitor instance in a specific embodiment according to the present invention.

FIG. 8 illustrates a representative visitor information look up procedure in a specific embodiment according to the present invention. In specific embodiments, information about a visitor can be used to provide a personal name lookup function. FIG. 8 illustrates a workstation 850 viewing an email document 840. When reading a document, such as the email 840 depicted on the screen of workstation 850, the user can invoke the personal name lookup function by clicking a browser button, or a button on a user's toolbar, for example. The source for the document 840 is passed to a process that implements the personal name lookup function. The personal name lookup process scans the document 840 to locate personal names. Then, the personal name lookup process requests information about the persons from the server 22. Personal names in the document for which there are records on the server 22 can be replaced by a hypertext link 825 to these records. These hypertext links can point to the record of visits that a person has made to the company, for example. The user clicks the hypertext link 825 to open an associated record 810 of the visitor's information. The user may view information about the visitor stored in the associated record 810. For example, the user may indicate that she wishes to view a picture of the visitor by selecting the hypertext link 825 with the mouse. The picture of the visitor can serve to refresh the user's memory about that person. Specific embodiments incorporating personal name lookup provide a solution to the problem of name-to-face mapping.

In an alternative embodiment, the personal name lookup function is implemented using a proxy. Accordingly, the hypertext links 825 are automatically inserted. In another specific embodiment, the world wide web is searched for home pages or email addresses associated with each person's name using, one of a variety of popular search engines in web sites such as for example, http://www.whowhere.lycos.com, and the like.

In an alternative embodiment, a portable visitor kiosk comprising a digital camera and an option portable card scanner is provided. Software running on the camera enables persons being visited to take pictures of the people they meet. These persons can speak their names, affiliations, reason for meeting, into a microphone attached to the camera, or type this information using a keypad on the camera. This data can be maintained on the camera or it can be downloaded to a server 22. In a specific embodiment, the information can be sold as a web service.

The preceding has been a description of the preferred embodiment of the invention. It will be appreciated that deviations and modifications can be made without departing from the scope of the invention, which is defined by the appended claims.

What is claimed is:

1. A visitor information gathering apparatus for a facility, comprising:
    a display;
    one or more input devices;
    a storage;
    a processor; and
    one or more sensors;
    wherein said processor is configured to gather information provided by a visitor to the facility using at least one input device from said one or more input devices responsive to prompts provided by said processor through said display;
    wherein said processor is configured to substantially contemporaneously gather information about said visitor using at least one sensor from said one or more sensors;
    wherein said processor is configured to store said information about said visitor gathered from said at least one input device and said at least one sensor into said storage; and
    wherein the processor is configured to communicate at least a portion of the information provided by the visitor using the at least one input device and the information about the visitor gathered by the at least one sensor to one or more appliances located within the facility wherein an appliance from the one or more appliances uses the information received from the processor to determine whether the visitor is permitted to use the appliance.

2. The apparatus of claim 1, wherein said information about said visitor is gathered using said at least one sensor without said visitor being aware of said gathering.

3. The apparatus of claim 1, further comprising an audio output device configured to output audio information to said visitor, said audio information determined based upon said information about said visitor gathered from said at least one input device and said at least one sensor.

4. The apparatus of claim 1, wherein said information gathered about said visitor comprises at least one of information about a name of said visitor, an organization represented by said visitor, a purpose of a visit, a date of a visit, a time of a visit, a person to be visited, and an identity of a group of visitors visiting together.

5. The apparatus of claim 1, wherein said display is configured to display to said visitor at least one of a greeting, a slide show of product images, advertising, stock values, daily cartoons, and news.

6. The apparatus of claim 1, further comprising a scanner that is configured to scan at least one of a first side and a second side of a business card having printing on at least one of said first side and said second side; and wherein, responsive to detecting text on said at least one of said first side and said second side, said processor processes said text in accordance with a language of said text.

7. The apparatus of claim 1, further comprising a microphone, wherein said microphone provides input of speech of said visitor.

8. The apparatus of claim 1, further comprising a video camera configured to capture an image of said visitor.

9. The apparatus of claim 1, further comprising a speaker, wherein said information gathered about said visitor comprises information indicating a person to be visited and wherein said speaker is configured to output directions to reach said person to be visited.

10. The apparatus of claim 1, further comprising a visitor wand configured to record experiences of said visitor.

11. The apparatus of claim 1 wherein the one or more sensors include a biometric sensor configured to gather biometric information about said visitor.

12. The apparatus of claim 1, further comprising a handwriting tablet configured to provide a sample of handwriting of said visitor.

13. The apparatus of claim 1 wherein said one or more sensors include a security sensor configured to provide information about potential threats.

14. The apparatus of claim 1, further comprising a telephone interface configured to communicate a telephone message to a person to be visited that said visitor has arrived.

15. The apparatus of claim 1 wherein said processor is configured to determine additional information about said visitor using a web interface, wherein the additional information is determined based upon said information about said visitor gathered from said at least one input device or said at least one sensor, the additional information comprising information about the visitor that is not provided by the visitor using the one or more input devices and is not gathered by the one or more sensors.

16. The apparatus of claim 1 wherein the processor is configured to communicate a portion of the information provided by the visitor using the at least one input device or the information gathered about the visitor using the at least one sensor to a person that said visitor intends to visit.

17. The apparatus of claim 1 wherein the processor is configured to determine information about said visitor's previous visit, the information identifying at least one person visited by the visitor during the previous visit.

18. The apparatus of claim 17 wherein the information about the visitor's previous visit is determined from a database accessible to said processor and storing information about said visitor.

19. The apparatus of claim 1 wherein the processor is configured to assign a web page for the visitor, the web page storing information indicative of one or more persons visited by the visitor, wherein the web page is updated after each visit of the visitor to the facility.

20. The apparatus of claim 19 wherein the web page is communicated to a person to be visited by the visitor prior to the visitor's visit to the facility.

21. The apparatus of claim 1 further comprising an output device configured to output information to the visitor, the information output by the output device being customized for the visitor based upon the information provided by the visitor using the one or more input devices and the information about the visitor captured by the one or more sensors.

22. The apparatus of claim 1 wherein the appliance uses the information received from the processor to determine an identify the visitor upon receiving a request from the visitor to use the appliance.

23. The apparatus of claim 1 wherein the appliance is a copy machine.

24. The apparatus of claim 1 further comprising:
a set of one or more locators situated at locations within the facility; and
a portable device provided to the visitor while the visitor is visiting the facility, the portable device configured to communicate with the set of locators using wireless communication;
wherein the set of locators are configured to track the visitor's location within the facility by wirelessly communicating with the portable device provided to the visitor.

25. The apparatus of claim 24 wherein the portable device is configured to record information identifying one or more locations visited by the visitor at the facility and information identifying one or more persons met by the visitor at the facility.

26. The apparatus of claim 25 wherein the portable device is configured to record information spoken during a meeting between the visitor and a person from the one or more persons.

27. The apparatus of claim 24 wherein the portable device is configured to:
store an itinerary for the visitor's visit to the facility, the itinerary identifying at least one location within the facility to be visited by the visitor; and
display the itinerary to the visitor; and
display direction information for reaching the at least one location.

28. A method for collecting information about visitors to a facility, said method comprising:
gathering information about a visitor in an interactive session with an automated kiosk located at the facility;
placing said information for the visitor gathered in the interactive session into a format in which said information may be stored;
storing said information for retrieval; and
based upon said gathered information about said visitor, automatically obtaining additional information about said visitor from one or more sources, the additional information comprising information that is not provided during the interactive session; and
communicating at least a portion of said gathered information and at least a portion of said additional information to a user; and
communicating a portion of the information for the visitor gathered in the interactive session to one or more appliances located within the facility, wherein an appliance from the one or more appliances uses the information received from the automated kiosk to determine whether the visitor is permitted to use the appliance.

29. The method of claim 28, wherein gathering information about said visitor at said automated kiosk comprises obtaining information from said visitor using a process of which said visitor is aware and obtaining information about said visitor using a process of which said visitor is not aware.

30. The method of claim 28, further comprising determining a person to be visited by said visitor based upon said information gathered about said visitor and wherein communicating said portion of said gathered information and said portion of said additional information to said user comprises communicating said portions to said person to be visited.

31. The method of claim 28, wherein obtaining said additional information comprises at least one of performing a search on the Internet, searching a publicly available database, searching a database of visitor information obtained from said automated kiosk, and searching a local document database.

32. A computer programming product for collecting information about visitors to a facility, said computer programming product comprising:
code for gathering information about a visitor in an interactive session with an automated kiosk;
code for placing said information into a format in which said information may be stored;
code for storing said information for retrieval;
code for obtaining, based upon said gathered information about said visitor, additional information about said visitor from one or more sources, the additional information comprising information that is not provided during the interactive session;
code for providing said additional information about said visitor and said information about said visitor gathered at said kiosk to a person interested in said information;
code for communicating a portion of the information gathered about the visitor in the interactive session to one or more appliances located within the facility, wherein an appliance from the one or more appliances uses the information received from the automated kiosk to determine whether the visitor is permitted to use the appliance; and
a computer readable storage medium for holding the codes.

* * * * *